US008115757B2

(12) United States Patent
Numao

(10) Patent No.: US 8,115,757 B2
(45) Date of Patent: Feb. 14, 2012

(54) DISPLAY DEVICE, IT'S DRIVING CIRCUIT, AND DRIVING METHOD

(75) Inventor: Takaji Numao, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 275 days.

(21) Appl. No.: 12/451,303

(22) PCT Filed: Apr. 24, 2008

(86) PCT No.: PCT/JP2008/057937
§ 371 (c)(1), (2), (4) Date: Nov. 5, 2009

(87) PCT Pub. No.: WO2009/034741
PCT Pub. Date: Mar. 19, 2009

(65) Prior Publication Data

US 2010/0128012 A1 May 27, 2010

(30) Foreign Application Priority Data

Sep. 11, 2007 (JP) ................................ 2007-234850

(51) Int. Cl.
*G06F 3/038* (2006.01)

(52) U.S. Cl. ........................................ 345/211; 345/204

(58) Field of Classification Search .................... 345/87, 345/89, 90, 96, 98, 100, 209, 211
See application file for complete search history.

(56) References Cited

U.S. PATENT DOCUMENTS

| | | | | |
|---|---|---|---|---|
| 5,296,847 | A | 3/1994 | Takeda et al. | |
| 6,509,894 | B1 | 1/2003 | Maekawa et al. | |
| 2002/0084970 | A1 | 7/2002 | Ozawa | |
| 2003/0117354 | A1 | 6/2003 | Maekawa et al. | |
| 2005/0190133 | A1* | 9/2005 | Kawachi | 345/87 |
| 2005/0280620 | A1* | 12/2005 | Iida et al. | 345/90 |
| 2006/0007092 | A1* | 1/2006 | Sekiguchi et al. | 345/92 |
| 2006/0125762 | A1* | 6/2006 | Fujita | 345/98 |
| 2006/0192745 | A1* | 8/2006 | Yamazaki | 345/100 |
| 2006/0208992 | A1* | 9/2006 | Akutsu et al. | 345/98 |
| 2006/0279504 | A1* | 12/2006 | Fujita | 345/98 |

FOREIGN PATENT DOCUMENTS

EP 0 907 159 4/1999

(Continued)

*Primary Examiner* — Amare Mengistu
*Assistant Examiner* — Stacy Khoo
(74) *Attorney, Agent, or Firm* — Harness, Dickey & Pierce, P.L.C.

(57) ABSTRACT

One embodiment of the present invention discloses a display device which can use a display element having a relatively large difference between a minimum gradation voltage and a maximum gradation voltage. A first selection period and a second selection period are included in a period (a scanning signal line selection period) in which each gate wiring is selected. In the first selection period, a first selection voltage for allowing every TFT included in a line, which is an object to be selected, to be in an ON state is applied to the gate wiring of the line which is the object to be selected. In a period between the first selection period and the second selection period, a non selection voltage is applied to the gate wiring which is the object to be selected and the voltage of an auxiliary capacity wiring corresponding to the gate wiring which is the object to be selected is changed. In the second selection period, a second selection voltage for allowing a part of the TFTs included in the line, which is the object to be selected, to be in an ON state is applied to the gate wiring which is the object to be selected.

11 Claims, 22 Drawing Sheets

FOREIGN PATENT DOCUMENTS

| | | |
|---|---|---|
| JP | 2-157815 | 6/1990 |
| JP | 11-64893 | 3/1999 |
| JP | 2000-305504 | 11/2000 |
| JP | 2002-202762 | 7/2002 |
| JP | 2006-276879 | 10/2006 |

* cited by examiner

| PP | AB | INPUT SIGNAL Dx | OUTPUT VOLTAGE Ax | |
|---|---|---|---|---|
| L | L | 0～42 | maxVS～minVS | a1 |
| | | 43～63 | minVS | a2 |
| L | H | 0～20 | maxVS | |
| | | 21～63 | maxVS～minVS | |
| H | L | 0～20 | minVS | |
| | | 21～63 | minVS～maxVS | |
| H | H | 0～42 | minVS～maxVS | |
| | | 43～63 | maxVS | |

Fig.6

| GSi | OE | AB | OUTPUT VOLTAGE Vx |
|---|---|---|---|
| H | L | L | VL |
| H | L | H | VL |
| H | H | L | VH |
| H | H | H | VM |
| L | – | – | VL |

a3

Fig.7

| TIMING PULSE | | AB | OUTPUT VOLTAGE Vk |
|---|---|---|---|
| inv (GCk−1) | GCk | | |
| L | L | L | VCL |
| | | H | VCL |
| L | H | L | VCL |
| | | H | VCM |
| H | L | L | VCL |
| | | H | VCM |
| H | H | L | VCH |
| | | H | VCH |

Fig.11

| FSP | L | | H | |
|---|---|---|---|---|
| GSi | H | | H | |
| AB | L | H | L | H |
| TONE 0 | VSH | VSH+ΔVP | VSL | VSL |
| TONE 21 | VSM | VSH | VSL | VSM |
| TONE 42 | VSL | VSM | VSM | VSH |
| TONE 63 | VSL | VSL | VSH | VSH+ΔVP |

b1

Fig.12

| FSP | L | | H | |
|---|---|---|---|---|
| GSi | H | | H | |
| AB | L | H | L | H |
| TONE 0 | 0 | ΔVP | −2ΔVP | −2ΔVP |
| TONE 21 | −ΔVP | 0 | −2ΔVP | −ΔVP |
| TONE 42 | −2ΔVP | −ΔVP | −ΔVP | 0 |
| TONE 63 | −2ΔVP | −2ΔVP | 0 | ΔVP |

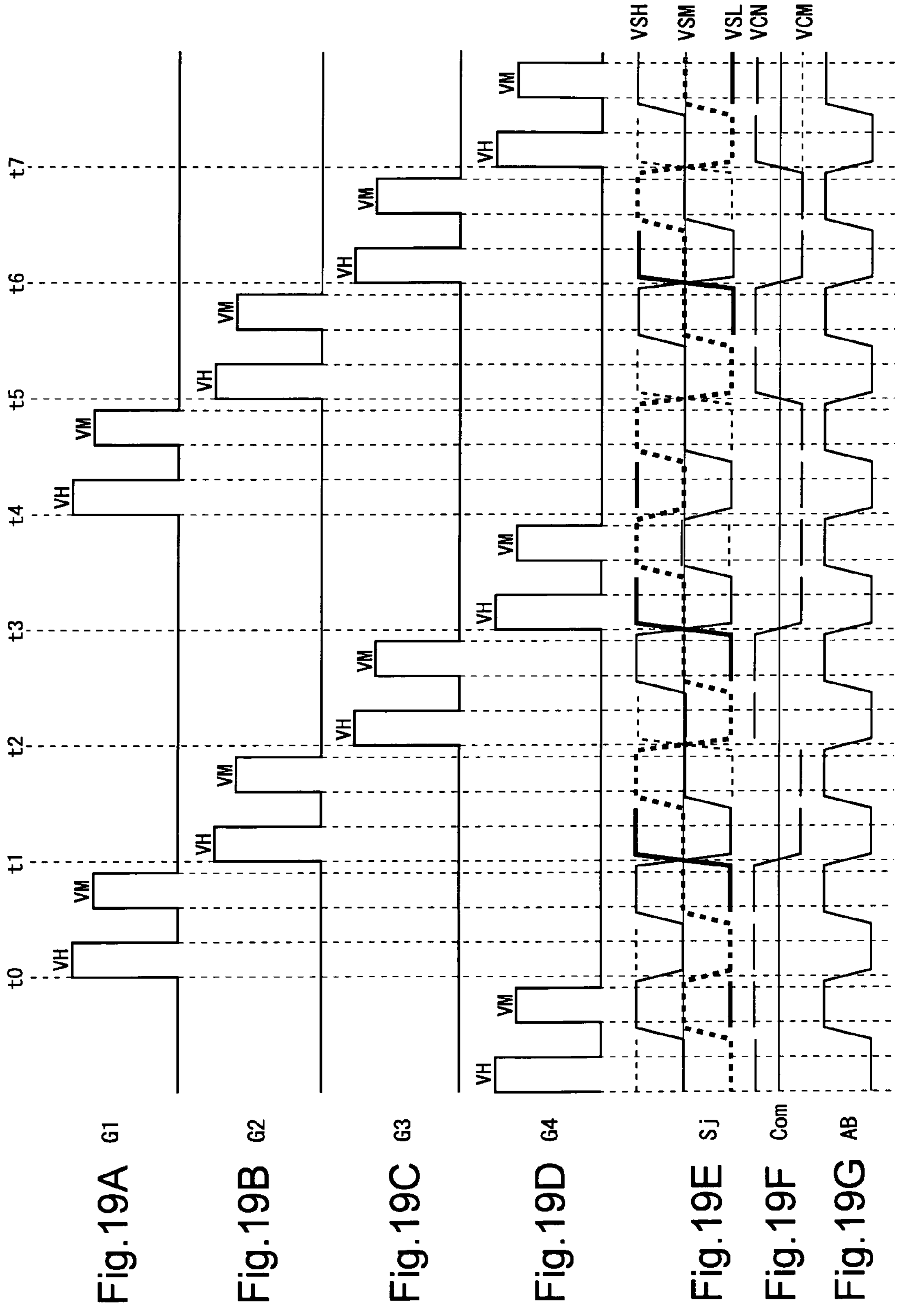
Fig.19A G1
Fig.19B G2
Fig.19C G3
Fig.19D G4
Fig.19E Sj
Fig.19F Com
Fig.19G AB
t0
t1
t2
t3
t4
t5
t6
t7
VH
VM
VSH
VSM
VSL
VCN
VCM

DISPLAY DEVICE, IT'S DRIVING CIRCUIT, AND DRIVING METHOD

TECHNICAL FIELD

The present invention relates to display devices, such as liquid crystal display devices, and particularly to a display device with reduced power consumption and improved response speed, as well as to a circuit and method for driving the same.

BACKGROUND ART

In recent years, liquid crystal display devices using TFTs (Thin Film Transistors), as in notebook computers, cell phones, and liquid crystal televisions, have become widespread. In liquid crystal display devices using TFTs, a drive circuit called a "source driver" supplies voltage to a liquid crystal in order to control the state of display by the liquid crystal. The source driver is configured by a semiconductor such as an IC (Integrated Circuit). Semiconductors increase in cost as their withstanding voltage increases. Therefore, the cost of liquid crystal display devices is reduced by narrowing the amplitude of an output voltage from the source driver.

For example, Japanese Laid-Open Patent Publication Nos. 2002-202762, 2006-276879, and 2-157815 disclose inventions of methods for driving a liquid crystal display device in which "a voltage applied to a liquid crystal is greater than a voltage outputted from a source driver". This will be described with reference to FIGS. 23 to 25. FIGS. 23A to 23C are diagrams describing operations in pixels of a liquid crystal display device in the conventional art. FIG. 24 is a block diagram illustrating an electrical configuration of the liquid crystal display device in the conventional art. FIG. 25 provides signal waveform diagrams describing Y-side operations in the conventional art.

In the conventional art, as shown in FIG. 23A, a TFT 116 is turned on first, and a voltage Vp is provided to a pixel electrode 118 from a source line 114. Then, as shown in FIG. 23B, the TFT 116 is turned off, and the voltage of an auxiliary capacitance line 113 changes by Vq. In this case, when it is assumed that an auxiliary capacitance 119 connected to the pixel electrode 118 has a capacity of Cstg, and a liquid crystal 105 has a capacity of Clc, the voltage Vr of the pixel electrode 118 is represented by equation (101) below:

$$Vr=Vp+Vq\times(Cstg/(Cstg+Clc)) \qquad \text{(101), as shown in FIG. 23C.}$$

Thus, the voltage applied to the pixel electrode 118 is set greater than the voltage Vp provided to the source line by Vq×(Cstg/(Cstg+Clc)). In this manner, the voltage provided to the source line can be set lower than a voltage to be applied to the pixel electrode, making it possible to narrow the amplitude of an output voltage from the source driver.

Note that in the conventional art, a voltage of each of auxiliary capacitance lines 113 should be controlled independently (for each of their corresponding gate lines 112). Therefore, as shown in FIG. 24, a flip-flop circuit 132 and a selector circuit (stored capacitance drive circuit) 134 are provided in each row for generating a voltage Yci to be provided to the auxiliary capacitance line 113 based on a signal Ysi provided to the gate line 112. Accordingly, by the flip-flop circuit 132 and the selector circuit 134, a signal Yci as shown in FIG. 25 is generated, and the voltage of the signal Yci is provided to the auxiliary capacitance line 113. In this case, the signal Yci is delayed by one horizontal scanning period from the signal Ysi provided to the gate line 112.

[Patent document 1] Japanese Laid-Open Patent Publication No. 2002-202762

[Patent document 2] Japanese Laid-Open Patent Publication No. 2006-276879

[Patent document 3] Japanese Laid-Open Patent Publication No. 2-157815

DISCLOSURE OF THE INVENTION

Problems to be Solved by the Invention

In the conventional art, a voltage greater than the voltage Vp provided to the source line by Vq×(Cstg/(Cstg+Clc)) is provided to the pixel electrode. However, the voltage provided to the pixel electrode increases uniformly, and therefore the amplitude of the voltage is not broadened. Accordingly, in the case of a display device for providing, for example, a 64-tone gradation display, the difference (voltage difference) is constant between the voltage provided to the pixel electrode when the tone value is "0" (hereinafter, referred to as the "0-tone voltage") and the voltage provided to the pixel electrode when the tone value is "63" (hereinafter, referred to as the "63-tone voltage"). Incidentally, in general, in the case of low-viscosity liquid crystals with high response speed, the difference (voltage difference) between the 0-tone voltage (minimum tone voltage) and the 63-tone voltage (maximum tone voltage) is relatively large. Accordingly, in the case where a liquid crystal with high response speed is employed, it is necessary to increase not only the voltage provided to the pixel electrode but also the difference between the 0- and 63-tone voltages.

Therefore, an objective of the present invention is to provide a display device capable of employing display elements with a relatively large difference between the minimum and maximum tone voltages. Another objective is to provide a display device with reduced power consumption and improved response speed.

Means for Solving the Problems

A first aspect of the present invention is directed to a display device provided with a plurality of video signal lines, a plurality of scanning signal lines crossing the video signal lines, switching elements provided at their corresponding intersections between the video signal lines and the scanning signal lines and having their conduction state controlled by a scanning signal provided to their corresponding scanning signal lines, pixel electrodes electrically connected to their corresponding video signal lines via the switching elements, a common electrode with predetermined capacitances being formed between the common electrode and the pixel electrodes, a scanning signal line drive circuit for selectively driving the scanning signal lines, and a video signal line drive circuit for applying a video signal to the video signal lines, the device comprising:

a pixel electrode potential shift portion for changing potentials of the pixel electrodes by changing potentials of predetermined electrodes capacitively coupled to the pixel electrodes, wherein, a scanning signal line selection period in which one scanning signal line is selected includes a preceding first selection period and a subsequent second selection period, the scanning signal line drive circuit applies a predetermined first selection voltage to selected scanning signal line during the first selection period, such that all switching elements for receiving a scanning signal from the selected scanning signal line are rendered conductive, and also applies a predetermined second selection voltage to the selected scanning signal line during the second selection period, such that a part of the switching elements for receiving the scanning signal from the selected scanning signal line is rendered conductive, the video signal line drive circuit applies a predetermined first voltage to the video signal lines during the second selection period, such that all switching elements corresponding to pixel electrodes that should exhibit a tone value within a predetermined first gradation range are rendered non-conductive, and the pixel electrode potential shift portion changes, during a period between the first selection period and the second selection period, the potentials of the predetermined electrodes capacitively coupled to pixel electrodes corresponding to the selected scanning signal line.

In a second aspect of the present invention, based on the first aspect of the invention, the pixel electrode potential shift portion changes potentials of pixel electrodes that should be subjected to writing based on a tone signal indicating a tone value within the first gradation range, the potentials being changed so as to be equivalent to or above the first voltage and to correspond to the tone value when the switching elements are of n-type, or the potentials being changed so as to be equivalent to or below the first voltage and to correspond to the tone value when the switching elements are of p-type.

In a third aspect of the present invention, based on the first aspect of the invention, the video signal line drive circuit applies, during the first selection period, a predetermined second voltage to the video signal lines as a video signal corresponding to a tone value within a predetermined second gradation range, and a voltage corresponding to each tone value to the video signal lines as a video signal corresponding to the tone value outside the second gradation range, all switching elements corresponding to pixel electrodes that should exhibit the tone value within the second gradation range are rendered conductive during the second selection period, and the tone value within the first gradation range and the tone value within the second gradation range are exclusive to each other.

In a fourth aspect of the present invention, based on the third aspect of the invention, the first voltage is a voltage within a range from a maximum value to an intermediate value of a voltage that can be applied as the video signal to the video signal lines by the video signal line drive circuit, provided that the switching elements are of n-type, or a voltage within a range from a minimum value to the intermediate value of the voltage that can be applied as the video signal to the video signal lines by the video signal line drive circuit, provided that the switching elements are of p-type, and the second voltage is a voltage within the range from the minimum value to the intermediate value of the voltage that can be applied as the video signal to the video signal lines by the video signal line drive circuit, provided that the switching elements are of n-type, or a voltage within the range from the maximum value to the intermediate value of the voltage that can be applied as the video signal to the video signal lines by the video signal line drive circuit, provided that the switching elements are of p-type.

In a fifth aspect of the present invention, based on the first aspect of the invention, the scanning signal line drive circuit applies a predetermined deselection voltage to the selected scanning signal line as a scanning signal during a period between the first selection period and the second selection period, such that all switching elements for receiving the scanning signal from the selected scanning signal line are rendered non-conductive.

In a sixth aspect of the present invention, based on the first aspect of the invention, the predetermined electrodes constitute the common electrode.

In a seventh aspect of the present invention, based on the first aspect of the invention, the device further comprises auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, wherein, the predetermined electrodes are the auxiliary capacitance electrodes.

In an eighth aspect of the present invention, based on the seventh aspect of the invention, the auxiliary capacitance electrodes are provided in one-to-one correspondence with the scanning signal lines, the device further comprises an auxiliary capacitance electrode drive circuit for driving the auxiliary capacitance electrodes independently of one another, and the auxiliary capacitance electrode drive circuit, as the pixel electrode potential shift portion, change potentials of auxiliary capacitance electrodes corresponding to the selected scanning signal line during a period between the first selection period and the second selection period.

In a ninth aspect of the present invention, based on the seventh aspect of the invention, the auxiliary capacitance electrodes are divided into a predetermined number of groups such that each group corresponds to a plurality of scanning signal lines, auxiliary capacitance electrodes included in each group are electrically connected to one another, and when a predetermined potential is set as a reference potential, the auxiliary capacitance electrodes included in each group have applied thereto:

a voltage having a positive polarity and being higher than in a period in which any scanning signal line corresponding to the group is selected, during a period in which any scanning signal line corresponding to the group is not selected, provided that voltages of pixel electrodes forming the auxiliary capacitances together with the auxiliary capacitance electrodes included in the group have a positive polarity at an end point of a period in which any scanning signal line corresponding to the group is selected; or a voltage having a negative polarity and being higher than in the period in which any scanning signal line corresponding to the group is selected, during the period in which any scanning signal line corresponding to the group is not selected, provided that the voltages of the pixel electrodes forming the auxiliary capacitances together with the auxiliary capacitance electrodes included in the group have a negative polarity at the end point of the period in which any scanning signal line corresponding to the group is selected.

In a tenth aspect of the present invention, based on the first aspect of the invention, the device further comprises auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, wherein, the auxiliary capacitance electrodes are electrically connected to the common electrode, and the predetermined electrodes constitute the common electrode or are the auxiliary capacitance electrodes.

In an eleventh aspect of the present invention, based on the first aspect of the invention, equation (1) below is established when the switching elements are of n-type, provided that the second selection voltage is VM, a minimum threshold voltage of the switching elements is minVth, and a maximum value of a voltage that can be applied to the video signal lines by the video signal line drive circuit as the video signal during the second selection period is maxVS2, and equation (2) below is established when the switching elements are of p-type, provided that the second selection voltage is VM, the minimum threshold voltage of the switching elements is minVth, and a minimum value of the voltage that can be applied to the video signal lines by the video signal line drive circuit as the video signal during the second selection period is minVS2:

$$VM-\min Vth<\max VS2 \quad (1),$$

$$VM+\min Vth>\min VS2 \quad (2), \text{ where } \min Vth>0.$$

A twelfth aspect of the present invention is directed to a drive circuit for a display device provided with a plurality of video signal lines, a plurality of scanning signal lines crossing the video signal lines, switching elements provided at their corresponding intersections between the video signal lines and the scanning signal lines and having their conduction state controlled by a scanning signal provided to their corresponding scanning signal lines, pixel electrodes electrically connected to their corresponding video signal lines via the switching elements, and a common electrode with predetermined capacitances being formed between the common electrode and the pixel electrodes, the circuit comprising:

a scanning signal line drive circuit for selectively driving the scanning signal lines;

a video signal line drive circuit for applying a video signal to the video signal lines; and a pixel electrode potential shift portion for changing potentials of the pixel electrodes by changing potentials of predetermined electrodes capacitively coupled to the pixel electrodes, wherein, a scanning signal line selection period in which one scanning signal line is selected includes a preceding first selection period and a subsequent second selection period, the scanning signal line drive circuit applies a predetermined first selection voltage to selected scanning signal line during the first selection period, such that all switching elements for receiving a scanning signal from the selected scanning signal line are rendered conductive, and also applies a predetermined second selection voltage to the selected scanning signal line during the second selection period, such that a part of the switching elements for receiving the scanning signal from the selected scanning signal line is rendered conductive, the video signal line drive circuit applies a predetermined first voltage to the video signal lines during the second selection period, such that all switching elements corresponding to pixel electrodes that should exhibit a tone value within a predetermined first gradation range are rendered non-conductive, and the pixel electrode potential shift portion changes, during a period between the first selection period and the second selection period, the potentials of the predetermined electrodes capacitively coupled to pixel electrodes corresponding to the selected scanning signal line.

Also, variants based on the twelfth aspect of the present invention, which will be apparent with reference to embodiments and the drawings, are conceivable as means for solving problems.

A twenty-third aspect of the present invention is directed to a drive method for a display device provided with a plurality of video signal lines, a plurality of scanning signal lines crossing the video signal lines, switching elements provided at their corresponding intersections between the video signal lines and the scanning signal lines and having their conduction state controlled by a scanning signal provided to their corresponding scanning signal lines, pixel electrodes electrically connected to their corresponding video signal lines via the switching elements, and a common electrode with predetermined capacitances being formed between the common electrode and the pixel electrodes, the method comprising:

a scanning signal line drive step for selectively driving the scanning signal lines;

a video signal line drive step for applying a video signal to the video signal lines; and a pixel electrode potential shift step for changing potentials of the pixel electrodes by changing potentials of predetermined electrodes capacitively coupled to the pixel electrodes, wherein, a scanning signal line selection period in which one scanning signal line is selected includes a preceding first selection period and a subsequent second selection period, in the scanning signal line drive step, a predetermined first selection voltage is applied to selected scanning signal line during the first selection period, such that all switching elements for receiving a scanning signal from the selected scanning signal line are rendered conductive, and a predetermined second selection voltage is applied to the selected scanning signal line during the second selection period, such that a part of the switching elements for receiving the scanning signal from the selected scanning signal line is rendered conductive, in the video signal line drive step, a predetermined first voltage is applied to the video signal lines during the second selection period, such that all switching elements corresponding to pixel electrodes that should exhibit a tone value within a predetermined first gradation range are rendered non-conductive, and in the pixel electrode potential shift step, during a period between the first selection period and the second selection period, the potentials of the predetermined electrodes capacitively coupled to pixel electrodes corresponding to the selected scanning signal line are changed.

Also, variants based on the twenty-third aspect of the present invention, which will be apparent with reference to embodiments and the drawings, are conceivable as means for solving problems.

Effects of the Invention

According to the first aspect of the present invention, a period in which each scanning signal line is selected (scanning signal line selection period) includes a first selection period and a second selection period, as described below. During the first selection period, all switching elements included in a row corresponding to a selected scanning signal line (hereinafter, referred to as a "selected row") are rendered conductive. As a result, a voltage applied to the video signal line is supplied to all pixel electrodes included in the selected row. Also, during a period between the first selection period and the second selection period, potentials of predetermined electrodes capacitively coupled to the pixel electrodes included in the selected row are changed. As a result, potentials of all pixel electrodes included in the selected row are changed in accordance with the change of the potentials of the predetermined electrodes. Furthermore, during the second selection period, apart of the switching elements included in the selected row are rendered conductive. In this case, any switching element corresponding to a pixel electrode that should be subjected to writing of a tone value within a first gradation range is rendered non-conductive, and therefore, the voltage of the pixel electrode is maintained at a level at the start point of the second selection period. On the other hand, any pixel electrode that should be subjected to writing of a tone value outside the first gradation range is supplied with a voltage corresponding to that tone value. Accordingly, the amplitude of the pixel electrode voltage is set greater than the amplitude of the voltage supplied to the video signal line by an amount of change (in the pixel electrode potential) in accordance with the change of the potential of the predetermined electrode. Thus, it is possible to employ display elements with a relatively large difference between the minimum tone voltage and the maximum tone voltage, without changing the conventional amplitude of the voltage to be provided to the video signal line. Also, in the case where display elements with the same difference between the minimum tone voltage and the maximum tone voltage as conventional are used, it is possible to reduce the amplitude of the voltage to be provided to the video signal line below the conventional amplitude, thereby reducing power consumption.

According to the second aspect of the present invention, at the start point of the second selection period, to a pixel electrode that should be subjected to writing of a tone value within a first gradation range, a voltage corresponding to each tone value is provided. In addition, the voltage corresponds to a voltage at which the switching element is rendered non-conductive, and therefore the pixel electrode voltage is maintained during the second selection period. Thus, it is possible, without impairing a gradation display based on a tone signal indicating a tone value within the first gradation range, to shift the pixel electrode voltage, thereby setting the amplitude thereof greater than the amplitude of the voltage provided to the video signal line.

According to the third aspect of the present invention, as for all switching elements corresponding to pixel electrodes that are provided with the same second voltage during the first selection period and should be subjected to writing of a tone value within the second gradation range, they are rendered conductive during the second selection period. Here, tone values within the first gradation ranges and tone values within the second gradation ranges are exclusive to each other, and any tone signal indicating a tone value outside the first gradation range is converted into a voltage corresponding to each tone value during the second selection period. Accordingly, any tone signal indicating a tone value within the second gradation range is also converted into a voltage corresponding to each tone value during the second selection period. On the other hand, as for all switching elements corresponding to pixel electrodes that should be subjected to writing of a tone value within the first gradation range, they are rendered non-conductive during the second selection period. Thus, it is possible to set the amplitude of the pixel electrode voltage greater than the amplitude of the voltage provided to the video signal line, without impairing a gradation display based on a tone signal indicating a tone value within the first gradation range.

According to the fourth aspect of the present invention, the maximum possible amplitude of the pixel electrode voltage is a sum of an amplitude corresponding to the difference between the minimum value and the maximum value of a voltage that can be applied to the video signal line and an amplitude corresponding to an amount of change (in the pixel electrode potential) in accordance with the change of the potential of the predetermined electrode. Thus, it is possible to efficiently increase the amplitude of the pixel electrode voltage.

According to the fifth aspect of the present invention, all switching elements included in a selected row are rendered non-conductive during a period between the first selection period and the second selection period. As a result, all pixel electrodes included in the selected row are each electrically isolated from the video signal line in accordance with the change of the potential of the predetermined electrode, making it possible to reliably change the potential thereof.

According to the sixth aspect of the present invention, the potential of the pixel electrode can be changed by changing the potential of the common electrode. Thus, it is possible to increase the amplitude of the pixel electrode voltage with a relatively simple configuration.

According to the seventh aspect of the present invention, it is possible to increase the amplitude of the pixel electrode voltage by changing the potential of the auxiliary capacitance electrode.

According to the eighth aspect of the present invention, the potentials of the pixel electrodes can be changed by changing the potentials of the auxiliary capacitance electrodes provided in one-to-one correspondence with the scanning signal lines. Thus, it is possible to increase the amplitude of the pixel electrode voltage with a configuration using a conventional circuit for driving the auxiliary capacitance electrodes.

According to the ninth aspect of the present invention, auxiliary capacitance electrodes are divided into a plurality of groups. Furthermore, during a period in which a scanning signal line corresponding to a given group is not selected (deselection period), a voltage applied to auxiliary capacitance electrodes included in that group has a broader amplitude than during a period in which the scanning signal line is selected (selection period). Accordingly, potentials of pixel electrodes forming auxiliary capacitances together with the auxiliary capacitance electrodes greatly fluctuate upon transition from the selection period to the deselection period. As a result, during a period in which a scanning signal line corresponding to each group is not selected, a sufficiently high voltage is applied between pixel electrodes corresponding to the group and the common electrode. In addition, circuit scale can be reduced as compared to the case where a plurality of auxiliary capacitance electrodes are driven individually.

According to the tenth aspect of the present invention, the common electrode and the auxiliary capacitance electrodes are electrically connected. Thus, it is possible to eliminate the need for any circuit for individually driving a plurality of auxiliary capacitance electrodes, thereby reducing circuit scale.

According to the eleventh aspect of the present invention, even when a threshold voltage varies among switching elements, the switching elements can be reliably rendered non-conductive by providing a maximum appliable voltage to the video signal line, so long as the switching elements are of n-type, for example. Thus, as for pixel electrodes corresponding to switching elements to which the maximum appliable voltage is provided as a video signal, the voltage is maintained at a level at the start point of the second selection period.

BRIEF DESCRIPTION OF THE DRAWINGS

FIG. 6 is a diagram describing determination of the magnitude of a voltage to be provided to a gate line in the first embodiment.

FIG. 7 is a diagram describing determination of the magnitude of a voltage to be provided to an auxiliary capacitance line in the first embodiment.

FIG. 11 is a diagram describing a variant of the first embodiment.

FIG. 12 is a diagram describing a variant of the first embodiment.

FIGS. 19A to 19G are diagrams describing a drive method in the third embodiment.

DESCRIPTION OF THE REFERENCE NUMERALS

Figures 1A, 1B, 1C, 1D, 1E, 1F:
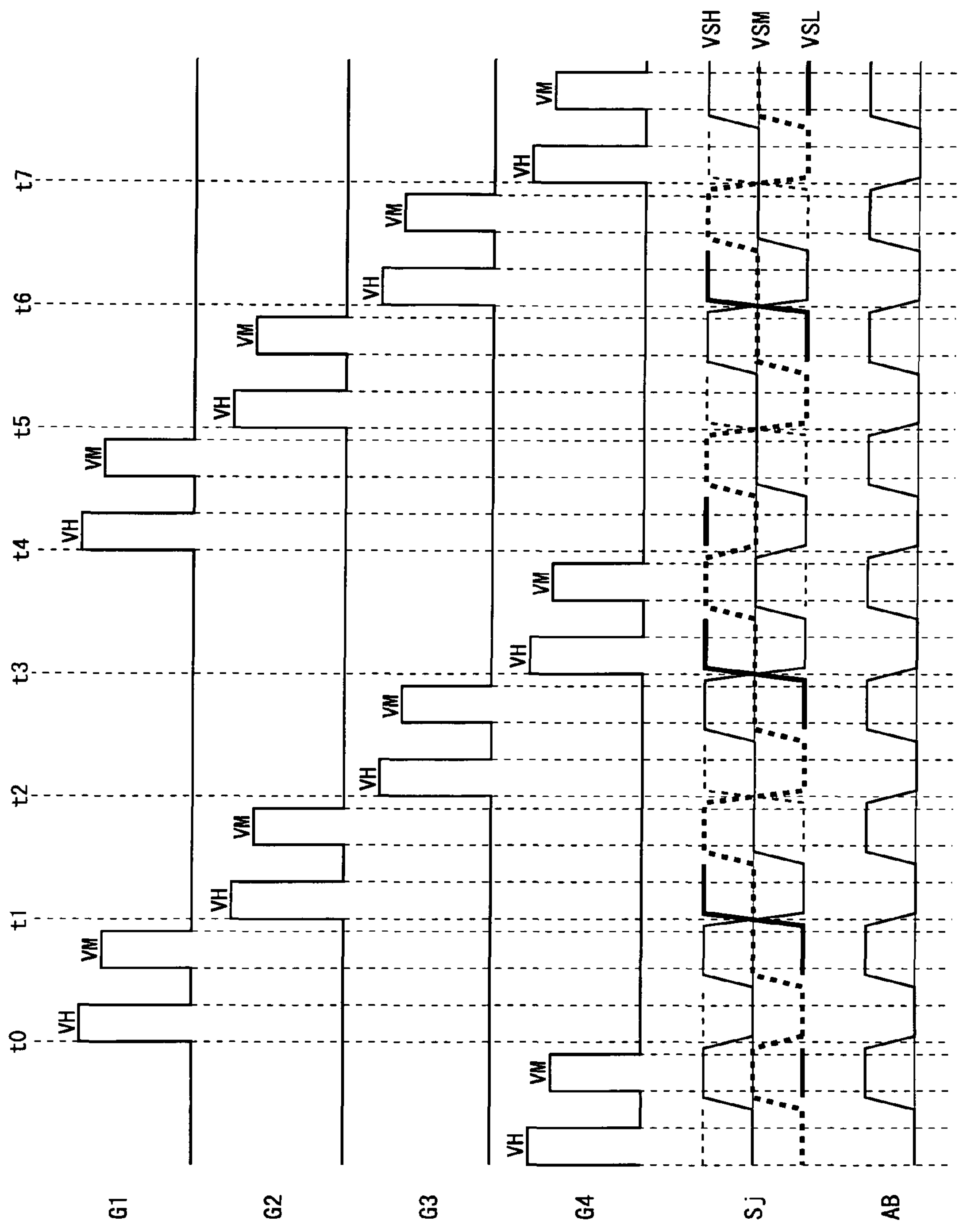
FIGS. 1A to 1F are signal waveform diagrams describing a drive method for a liquid crystal display device according to a first embodiment of the present invention.

20 TFT
21 pixel electrode
22 liquid crystal capacitance
23 auxiliary capacitance
24 common electrode
31, 41, 51 shift register
32 register
33 D/A conversion circuit
42 gate output circuit
52 capacitance line output circuit
100 display control circuit
200 display portion
300 source driver (video signal line drive circuit)
400 gate driver (scanning signal line drive circuit)
500 auxiliary capacitance driver
AB output voltage control signal
Aij pixel formation portion
C1 to Cm auxiliary capacitance line, auxiliary capacitance line drive signal
Dx digital video signal
FSP auxiliary capacitance start pulse signal
G1 to Gm gate line, selection signal
Pij pixel electrode
PP polarity signal
S1 to Sn source line, drive video signal

BEST MODE FOR CARRYING OUT THE INVENTION

1. Concept of the Present Invention

Before describing embodiments, the basic concept of the present invention will be described. Note that the description will be given here on the premise of the following display device. The display device has a display portion including a plurality of source lines, a plurality of gate lines, and a plurality of pixel formation portions provided at their corresponding intersections between the source lines and the gate lines. Each pixel formation portion includes, for example, a switching element, which has a gate electrode connected to a gate line passing through its corresponding intersection and a source electrode connected to a source line passing through the intersection, a pixel electrode, which is connected to a drain electrode of the switching element, and an electro-optic element such as a liquid crystal. Note that in the present description, the term "voltage" is used to mean a "potential with respect to a predetermined potential (e.g., ground potential)". For example, a "pixel electrode voltage" means the potential of a pixel electrode with respect to the predetermined potential. Also, a gate line, a source line, a switching element, and a pixel electrode which are subjects of description are referred to as a "subject gate line", a "subject source line", a "subject switching element", and a "subject pixel electrode", respectively.

In conventional display devices, when the switching element is rendered conductive, the conductive state continues for approximately one horizontal scanning period. On the other hand, in the display device according to the present invention, "a period in which the switching element is rendered conductive" occurs twice within one horizontal scanning period. Here, the first (preceding period) of the two periods in which the switching element is rendered conductive is referred to as the "first selection period", and the second period is referred to as the "second selection period". Also, a period in which the switching element is rendered non-conductive is referred to as a "deselection period".

During the first selection period, a predetermined first selection voltage VH is applied to the subject gate line, and a first data voltage VS1 based on a tone signal is applied to the subject source line. As a result, the subject switching element is rendered conductive, and the first data voltage VS1 is provided to the subject pixel electrode. Thereafter (after the end of the first selection period but before the start of the second selection period), the voltage of the subject pixel electrode changes by ΔVP. Specifically, the voltage of the subject pixel electrode changes from VS1 to "VS1+αVP". Note that the manner in which the first selection voltage VH, the first data voltage VS1, and the magnitude of ΔVP are set will be described later.

During the second selection period, a predetermined second selection voltage VM is applied to the subject gate line, and a second data voltage VS2 based on a tone signal is applied to the subject source line. Here, when it is assumed that the threshold voltage of the subject switching element is Vth, if equations (1) and (2) below are established, the switching element is non-conductive.

$$VM-Vth<VS1+\Delta VP \tag{1}$$

$$VM-Vth<VS2 \tag{2}$$

When equations (1) and (2) above are established so that the subject switching element is rendered non-conductive, the voltage of the subject pixel electrode is maintained at "VS1+ΔVP".

On the other hand, when equation (3) below is established during the second selection period, the subject switching element is rendered conductive.

$$VM-Vth>VS2 \tag{3}$$

When equation (3) above is established so that the subject switching element is rendered conductive, the voltage of the subject pixel electrode is set to VS2.

In this manner, by performing drive such that during the second selection period "some switching elements are rendered conductive" while "other switching elements are rendered non-conductive", it becomes possible to set the amplitude of the pixel electrode voltages greater than the amplitude of the voltage applied to the source lines by ΔVP.

Next, the manner in which the pixel electrode voltage is changed by ΔVP will be described. Generally, in liquid crystal display devices, liquid crystal capacitances are formed by both a common electrode (opposing electrode) provided in common to the plurality of pixel formation portions and pixel electrodes. Also, there are many liquid crystal display devices further comprising auxiliary capacitance lines (auxiliary capacitance electrodes), and comprising auxiliary capacitances, which are disposed in parallel to the liquid crystal capacitances, formed by both the auxiliary capacitance lines and pixel electrodes. Exemplary techniques for changing the pixel electrode voltage in such a liquid crystal display device include the following.

To begin with, as a first technique, a method in which the pixel electrode voltage is changed by changing the voltage of the common electrode can be presented. When it is assumed that the pixel electrode voltage before change (the aforementioned first data voltage) is VS1, the liquid crystal capacitance has a capacity of Clc, the auxiliary capacitance has a capacity of Cs, and the amount of voltage change of the common electrode is ΔVc, the pixel electrode voltage of ter change is such that:

$$VS1+\Delta VP=VS1+\Delta vc\times(Clc/(Cs+Clc)) \tag{4}$$

Next, as a second technique, a method in which the pixel electrode voltage is changed by changing the voltage of the auxiliary capacitance line can be presented. When it is assumed that the amount of voltage change of the auxiliary capacitance line is ΔVs, the pixel electrode voltage after change is such that:

$$VS1+\Delta VP=VS1+\Delta Vs\times(Cs/(Cs+Clc)) \tag{5}$$

Furthermore, as a third technique, a method in which the pixel electrode voltage is changed by changing both the voltage of the common electrode and the voltage of the auxiliary capacitance line can be presented. According to this technique, the pixel electrode voltage after change is such that:

$$VS1+\Delta VP=VS1+(\Delta Vc\times Clc+\Delta Vs\times Cs)/(Cs+Clc) \tag{6}$$

In the case where the third technique is employed, when the setting is made such that "ΔVc=ΔVs=ΔVP", all auxiliary capacitance lines and the common electrode can be configured to be short-circuited. This configuration requires a broadened amplitude of the voltage to be applied to the gate lines, but it eliminates the need for any circuit for driving the auxiliary capacitance lines, resulting in cost reduction. On the other hand, when the auxiliary capacitance lines are configured to be driven independently of the common electrode in the same manner as conventional, circuits for individually driving the auxiliary capacitance lines are required, but the amplitude of the voltage to be applied to the gate lines may remain the same as conventional, and therefore it is possible to prevent power consumption from increasing.

Incidentally, threshold characteristics of switching elements vary from one switching element to another. Accordingly, it is assumed that the switching elements are n-type TFTs, and their threshold voltages Vth vary within the range of minVth (minimum) to maxVth (maximum). In this case, when it is assumed that the maximum voltage applied to the source lines during the first selection period is maxVS1, equation (7) below is preferably established.

$$VH-\max Vth>\max VS1 \tag{7}$$

If equation (7) above is not established, a part of the switching elements to be rendered conductive might not be rendered conductive, so that in the pixel formation portions including such switching elements, the pixel electrode voltage would not change even before the start of the first selection period.

Also, when it is assumed that the maximum and minimum voltages applied to the source lines during the second selection period are maxVS2 and minVS2, respectively, equations (8) and (9) below are preferably established.

$$VM-\min Vth<\max VS2 \tag{8}$$

$$VM-\max Vth>\min VS2 \tag{9}$$

When equations (8) and (9) above are established, application of voltage maxVS2 to the subject source line renders the subject switching element non-conductive, and application of voltage minVS2 to the subject source line renders the subject switching element conductive, regardless of the threshold characteristics of the switching elements.

When the voltage of the subject pixel electrode changes from VS1 to "VS1+ΔVP" after the first selection period, if equation (10) below is established, the subject switching element is rendered non-conductive, so that the voltage of the subject pixel electrode is maintained at "VS1+ΔVP".

$$VM-\min Vth<VS1+\Delta VP \tag{10}$$

On the other hand, when the voltage of the subject pixel electrode changes from VS1 to "VS1+ΔVP" after the first selection period, if equation (12) below is established, the subject switching element is rendered conductive, so that the voltage of the subject pixel electrode is set to VS2.

$$VM-\max Vth>VS2 \tag{12}$$

Note that when equation (13) below is established, the switching element is rendered conductive or non-conductive depending on threshold characteristics of the switching element.

$$VM-\min Vth>VS2>VM-\max Vth \tag{13}$$

In this case, by determining the voltage VS2 to be applied to the subject source line during the second selection period, such that equation (14) below is established, the voltage VS2 is provided to the subject pixel electrode regardless of the threshold characteristics of the switching element.

$$VS1+\Delta VP=VS2 \tag{14}$$

In this manner, the amplitude of the pixel electrode voltage can be set greater than the amplitude of the voltage applied to the source line by ΔVP.

Incidentally, the voltage VS1 applied to the subject source line during the first selection period is generally equalized with the voltage VS2 applied to the subject source line during the second selection period, and therefore when the switching element is of n-type, the second selection voltage VM is preferably set lower than the first selection voltage VH. The subject switching element must be rendered conductive during the first selection period and the subject switching element must be rendered "conductive or non-conductive" during the second selection period. Note that if equation (15) below is established, the second selection voltage VM, in place of the first selection voltage VH, may be applied to the subject gate line during the first selection period.

$$VS1\leqq VM-\max Vth \tag{15}$$

As a result, the voltage to be applied to the gate line can be equalized between the selection periods.

Also, the amplitude of the pixel electrode voltage can be further broadened by setting three or more selection periods so that the shift of the pixel electrode voltage (the aforementioned change by ΔVP) and application of the second selection voltage VM to the gate line and the application of the voltage VS2 to the source line are repeated.

Hereinafter, embodiments of the present invention will be described with reference to the accompanying drawings.

2. First Embodiment

2.1 Overall Configuration and Operation

Figure 2:
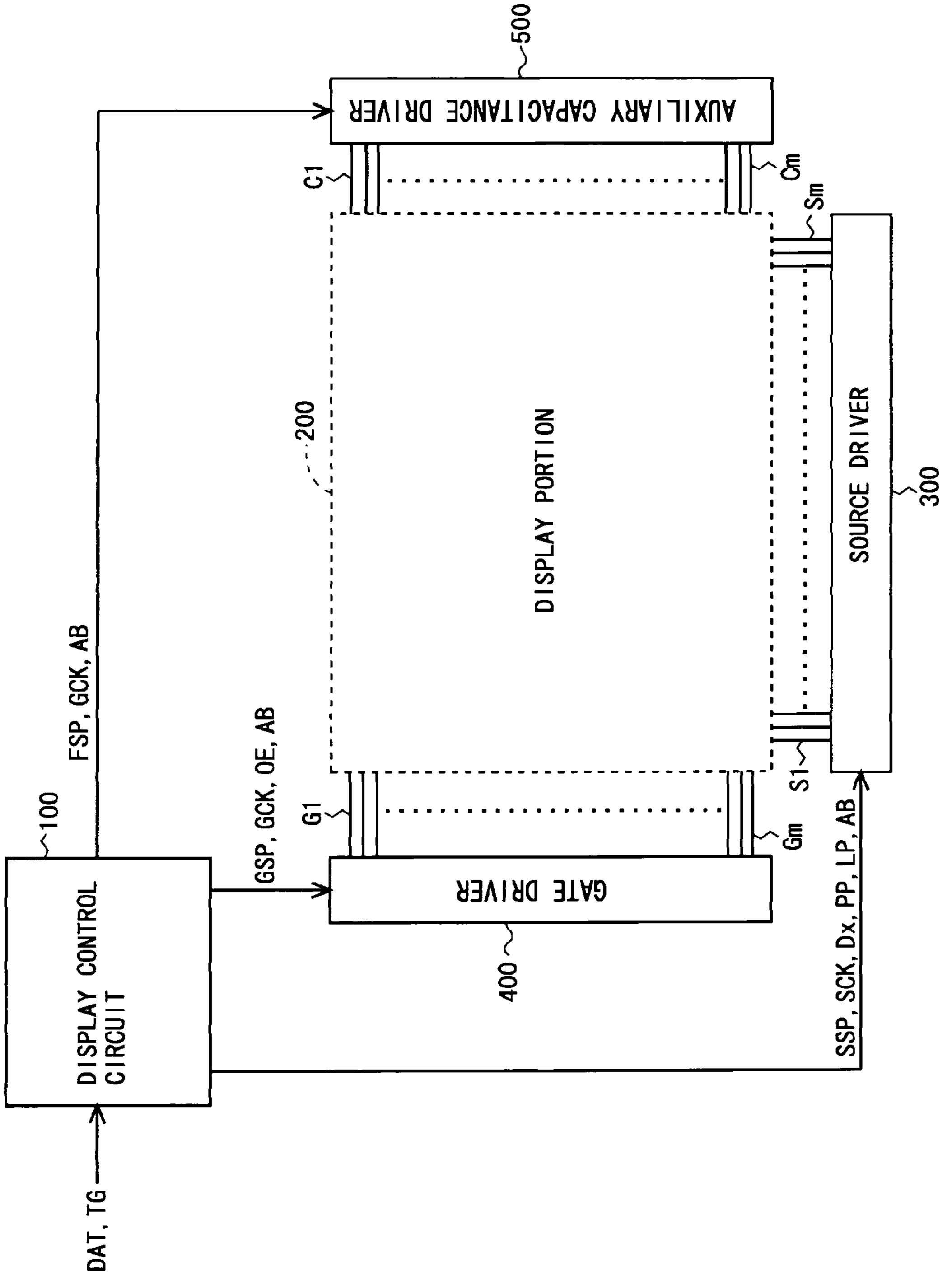
FIG. 2 is a block diagram illustrating the overall configuration of the liquid crystal display device in the first embodiment.
Figure 3:
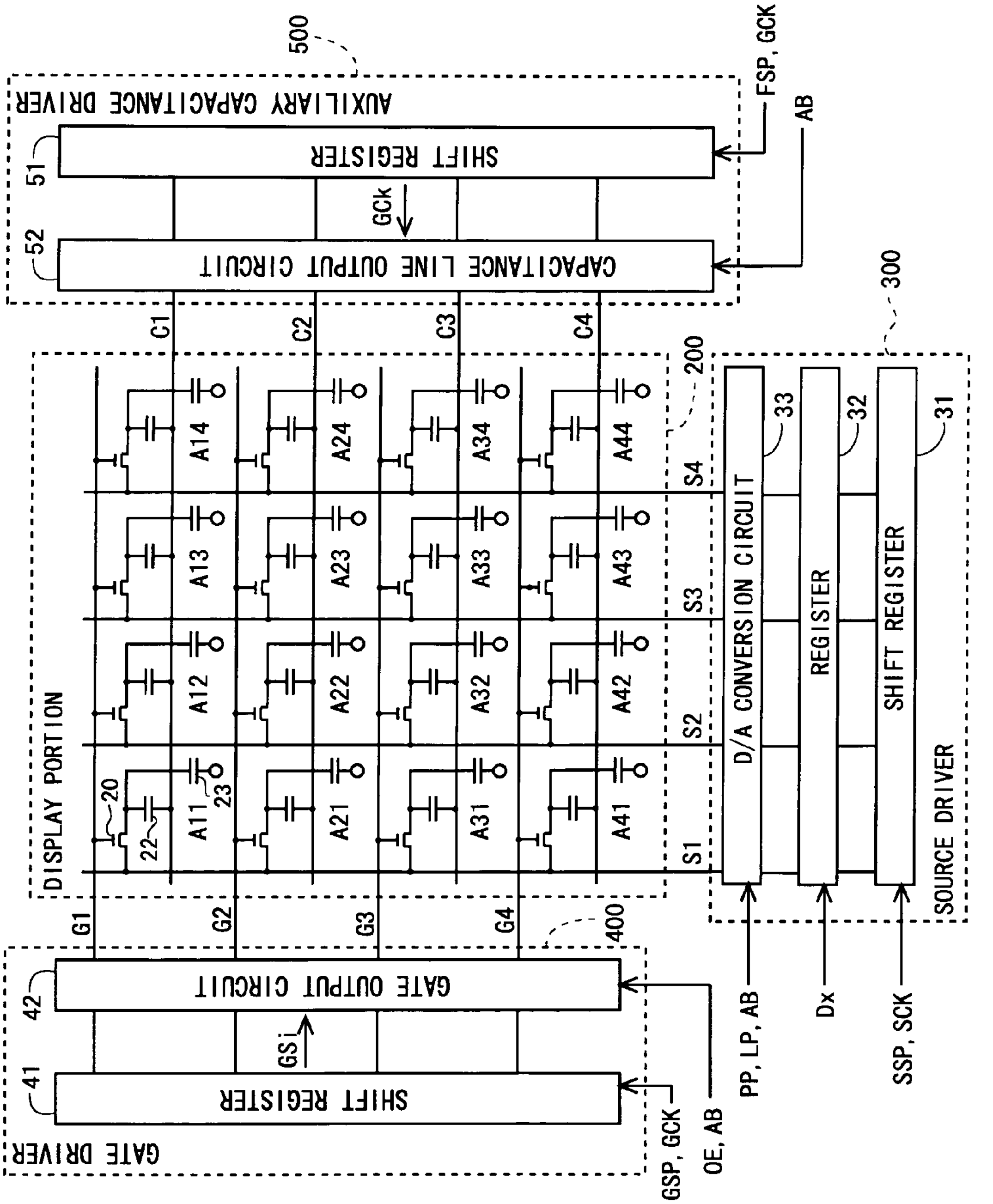
FIG. 3 is a block diagram illustrating detailed configurations of drivers and a display portion in the first embodiment.

FIG. 2 is a block diagram illustrating the overall configuration of a liquid crystal display device according to a first embodiment of the present invention. The liquid crystal display device includes a display control circuit 100, a display portion 200, a source driver (video signal line drive circuit) 300, a gate driver (scanning signal line drive circuit) 400, and an auxiliary capacitance driver (auxiliary capacitance electrode drive circuit) 500. Hereinafter, the source driver 300, the gate driver 400, and the auxiliary capacitance driver 500 may also be collectively referred to as a driver (drive circuit). FIG. 3 is a block diagram illustrating detailed configurations of the drivers and the display portion 200 in the liquid crystal display device. Note that the liquid crystal display device performs a 64-tone gradation display.

The display portion 200 includes n source lines (video signal lines) S1 to Sn, m gate lines (scanning signal lines) G1 to Gm, and a plurality (n×m) of pixel formation portions provided at their corresponding intersections between the n source lines and the m gate lines. Also, the display portion 200 is provided with m auxiliary capacitance lines C1 to Cm corresponding to the gate lines G1 to Gm. Note that, while the plurality of pixel formation portions form a pixel matrix of m rows×n columns, FIG. 3 illustrates a configuration for only four rows×four columns. Also, in FIG. 3, the pixel formation portion disposed in the i'th row of the j'th column is denoted by reference character Aij.

Figures 4, 5:
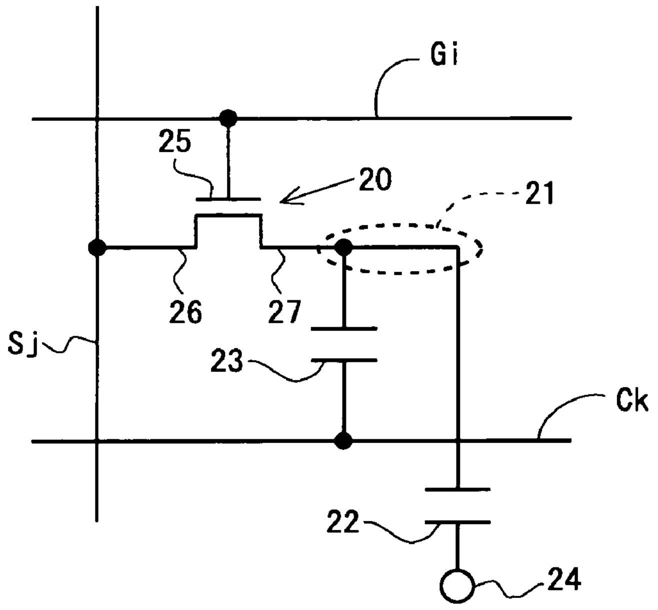
FIG. 4 is a circuit diagram illustrating the configuration of a pixel formation portion in the first embodiment.
FIG. 5 is a diagram describing digital-to-analog conversion by a D/A conversion circuit in the first embodiment.

FIG. 4 is a circuit diagram illustrating the configuration of a pixel formation portion Aij. As shown in FIG. 4, each pixel formation portion Aij includes a TFT 20, which has a gate electrode 25 connected to a gate line G1 passing through its corresponding intersection and a source electrode 26 connected to a source line Sj passing through the intersection, a pixel electrode 21 connected to a drain electrode 27 of the TFT 20, a common electrode 24 and an auxiliary capacitance line (auxiliary capacitance electrode) Ck provided in common to the plurality of pixel formation portions Aij, a liquid crystal capacitance 22 formed by the pixel electrode 21 and the common electrode 24, and an auxiliary capacitance 23 formed by the pixel electrode 14 and the auxiliary capacitance line Ck. Also, a pixel capacitance Cp is formed by the liquid crystal capacitance 22 and the auxiliary capacitance 23. In addition, based on a video signal received by the source electrode 26 of the TFT 20 from the source line Sj, when the gate electrode 25 of each TFT 20 receives an active scanning signal (selection signal) from the gate line G1, a voltage representing a pixel value is held in the pixel capacitance Cp. Note that the following, description is given with the pixel electrode 21 in the pixel formation portion Aij disposed in the i'th row of the j'th column being denoted by reference character Pij.

The display control circuit 100 receives a data signal DAT and a timing control signal group TG, which are transmitted externally, and outputs a digital video signal Dx; a source start pulse signal SSP, a source clock signal SCK, a gate start pulse signal GSP, a gate clock signal GCK, an auxiliary capacitance start pulse signal FSP, a latch pulse signal LP, and a gate output control signal OE for controlling the timing of displaying an image on the display portion 200; and an output voltage control signal AB and a polarity signal PP for controlling voltages to be applied to the source line Sj and the auxiliary capacitance line Ck.

The source driver 300 receives the digital image signal Dx, the source start pulse signal SSP, the source clock signal SCK, the latch pulse signal LP, the polarity signal PP, and the output voltage control signal AB outputted from the display control circuit 100, and applies a drive video signal to the source lines S1 to Sn in order to charge the pixel capacitance Cp of each pixel formation portion Aij in the display portion 200.

The gate driver 400 receives the gate start pulse signal GSP, the gate clock signal GCK, the gate output control signal OE, and the output voltage control signal AB outputted from the display control circuit 100, and applies a selection signal (scanning signal) to the gate lines G1 to Gm sequentially. Note that in the present embodiment, the gate lines G1 to Gm are each selected twice during one horizontal scanning period.

The auxiliary capacitance driver 500 receives the auxiliary capacitance start pulse signal FSP, the gate clock signal GCK, and the output voltage control signal AB outputted from the display control circuit 100, and applies an auxiliary capacitance line drive signal to the auxiliary capacitance lines C1 to Cm.

In this manner, the drive video signal is applied to each of the source lines S1 to Sn, the selection signal is applied to each of the gate lines G1 to Gm, and the auxiliary capacitance line drive signal is applied to each of the auxiliary capacitance lines C1 to Cm, so that an image is displayed on the display portion 200.

2.2 Configuration and Operation of the Source Driver

As shown in FIG. 3, the source driver 300 includes a shift register 31, a register 32, and a D/A conversion circuit 33. Note that the shift register 31 is composed of n bits (n stages), and the register 32 is composed of "n×6" bits. Also, the D/A conversion circuit 33 has n 6-bit latches.

Into the shift register 31 the source start pulse signal SSP and the source clock signal SCK are inputted. Based on the signals SSP and SCK, the shift register 31 sequentially transfers pulses included in the source start pulse signal SSP from input terminal to output terminal. In accordance with the pulse transfer, sampling pulses corresponding to the source lines S1 to Snare outputted from the shift register 31, and the sampling pulses are sequentially inputted into the register 32.

The register 32 samples and holds 6-bit data from the display control circuit 100 as the digital video signal Dx, in accordance with the timing of sampling pulses outputted from the shift register 31. The D/A conversion circuit 33 takes n pieces of 6-bit data held in the register 32 into n 6-bit latches in accordance with the timing of the pulse of the latch pulse signal LP, and performs digital-to-analog conversion on them. Furthermore, the D/A conversion circuit 33 applies the digital-to-analog converted data to source lines S1 to Sn as a drive video signal.

Here, the rules by which digital-to-analog conversion is performed in the D/A conversion circuit 33 will be described. FIG. 5 is a table describing digital-to-analog conversion by the D/A conversion circuit 33 in the present embodiment. While a signal generated by digital-to-analog conversion is applied to the source lines S1 to Sn as a drive video signal, the voltage ("output voltage Ax" in FIG. 5) of the drive video signal is determined as shown in FIG. 5 in accordance with the logic levels of the polarity signal PP and the output voltage control signal AB based on a digital video signal ("input signal Dx" in FIG. 5).

Note that in FIG. 5, "L" and "H" for the polarity signal PP and the output voltage control signal AB denote the logic levels of the signals ("L" for "low level", and "H" for "high level"). Also, values ("0", "21", etc.) for the input signal Dx denote tone values. Furthermore, "maxVS" for the output voltage Ax denotes the maximum voltage that can be applied to the source lines S1 to Sn (hereinafter, referred to as a "source maximum voltage"), and "minVS" for the output signal Ax denotes the minimum voltage that can be applied to the source lines S1 to Sn (hereinafter, referred to as a "source minimum voltage"). For example, the row denoted by character a1 indicates that, when the logic level of the polarity signal PP is "low level" and the logic level of the output voltage control signal AB is "low level", any input signal Dx indicating a tone value from "0" to "42" is converted into a voltage in the range from the source maximum voltage maxVS to the source minimum voltage minVS. More specifically, the input signal Dx with a tone value of "0" is converted into the source maximum voltage maxVS, and the input signal Dx with a tone value of "42" is converted into the source minimum voltage minVS. In addition, the input signal Dx with a tone value of "21" is converted into a voltage (hereinafter, referred to as a "source intermediate voltage") approximately intermediate between the source maximum voltage maxVS and the source minimum voltage minVS. In this manner, as the tone value of the input signal Dx decreases, the voltage into which the input signal Dx is converted approximates the source maximum voltage maxVS, and as the tone value of the input signal Dx increases, the voltage into which the input signal Dx is converted approximates the source minimum voltage minVS. In addition, the row denoted by character a2 indicates that, when the logic levels of the polarity signal PP is "low level" and the logic level of the output voltage control signal AB is "low level", any input signal Dx indicating a tone value from "43" to "63" is converted into the source minimum voltage minVS.

Also, in the present embodiment, when the logic level of the polarity signal PP is "low level", i.e., the polarity of the video signal is negative, any tone value from "0" to "20" corresponds to a tone value within a first gradation range, and any tone value from "43" to "63" corresponds to a tone value within a second gradation range. Furthermore, when the logic level of the polarity signal PP is "high level", i.e., the polarity of the video signal is positive, any tone value from "0" to "20" corresponds to a tone value within the second gradation range, and any tone value from "43" to "63" corresponds to a tone value within the first gradation range.

Moreover, in the present embodiment, the source maximum voltage maxVS corresponds to the predetermined first voltage, and the source minimum voltage minVS corresponds to the predetermined second voltage.

2.3 Operation of the Gate Driver

As shown in FIG. 3, the gate driver 400 includes a shift register 41 and a gate output circuit 42. Note that the shift register 41 is composed of m bits (m stages). Into the shift register 41 a gate start pulse signal GSP and a gate clock signal GCK are inputted. The shift register 41 sequentially transfers pulses included in the gate start pulse signal GSP from input terminal to output terminal based on the signals GSP and GCK. In accordance with the pulse transfer, timing pulses GSi corresponding to the gate lines S1 to Sn are outputted sequentially from the shift register 41, and the timing pulses GSi are sequentially inputted into the gate output circuit 42.

The gate output circuit 42 outputs selection signals G1 to Gm to the gate lines G1 to Gm (for convenience sake, the gate lines and the selection signals are denoted by the same reference characters) based on the timing pulses GSi outputted from the shift register 41 and the gate output control signal OE and the output voltage control signal AB outputted from the display control circuit 100. In this case, the magnitudes of the voltages supplied to the gate lines G1 to Gm as the selection signals G1 to Gm ("output voltage Vx" in FIG. 6) are determined as shown in FIG. 6.

Note that in FIG. 6, "L" and "H" for the timing pulse GSi, the gate output control signal OE, and the output voltage control signal AB denote the logic levels of the signals. Also, "VH" for the output voltage Vx denotes a voltage (first selection voltage) at which the gates of the TFTs 20 are rendered conductive, "VL" for the output voltage Vx denotes a voltage (deselection voltage) at which the gates of the TFTs 20 are rendered non-conductive, and "VM" for the output voltage Vx denotes a voltage (second selection voltage) at which the gates of a portion of the TFTs 20 are rendered conductive. Also, the row denoted by character a3 indicates that, when the logic level of the timing pulse GSi is low level, the output voltage Vx is "VL" regardless of the logic levels of the gate output control signal OE and the output voltage control signal AB.

2.4 Auxiliary Capacitance Driver Operation

As shown in FIG. 3, the auxiliary capacitance driver 500 includes a shift register 51 and a capacitance line output circuit 52. Note that the shift register 51 is composed of m bits (m stages). Into the shift register 51 the auxiliary capacitance start pulse signal FSP and the gate clock signal GCK are inputted. The shift register 51 sequentially transfers pulses included in the auxiliary capacitance start pulse signal FSP from input terminal to output terminal based on the signals FSP and GCK. In accordance with the pulse transfer, timing pulses GCK corresponding to the auxiliary capacitance lines C1 to Cm are outputted sequentially from the shift register 51, and the timing pulses GCK are sequentially inputted into the capacitance line output circuit 52. Note that the timing pulses GCK outputted from the shift register 51 are inverted in polarity on a register-to-register basis.

The capacitance line output circuit 52 outputs auxiliary capacitance line drive signals C1 to Cm to the auxiliary capacitance lines C1 to Cm (for convenience sake, the auxiliary capacitance lines and the auxiliary capacitance line drive signals are denoted by the same reference characters) based on the timing pulse GCK outputted from the shift register 51 and the output voltage control signal AB outputted from the display control circuit 100. In this case, the magnitudes of the voltages supplied to the auxiliary capacitance lines C1 to Cm as the auxiliary capacitance line drive signals C1 to Cm ("output voltage Vk" in FIG. 7) are determined as shown in FIG. 7.

Note that in FIG. 7, "inv(GCK−1)" denotes a signal obtained by inverting the polarity of the timing pulse corresponding to the auxiliary capacitance line Ck-1 in the (k-1)'th row. Also, "L" and "H" for the timing pulse and the output voltage control signal AB denote the logic levels of the signals. Furthermore, "VCL" for the output voltage Vk denotes a predetermined voltage which is relatively low, "VCH" for the output voltage Vk denotes a predetermined voltage which is relatively high, and "VCM" for the output voltage Vk denotes a predetermined voltage from VCL to VCH.

In the present embodiment, a pixel electrode potential shift portion is realized by the auxiliary capacitance driver 500.

2.5 Drive Method

Next, a drive method in the present embodiment will be described. FIGS. 1A to 1F illustrate respective waveforms for selection signal applied to the first-row gate line G1, signal applied to the second-row gate line G2, signal applied to the third-row gate line G3, signal applied to the fourth-row gate line G4, the drive video signal applied to the source line Sj, and the output voltage control signal AB. FIGS. 8A to 8F illustrate respective waveforms for the pixel electrode voltage at the pixel formation portion A1*j*, the auxiliary capacitance line drive signal applied to the first-row auxiliary capacitance line C1, the pixel electrode voltage at the pixel formation portion A2*j*, the auxiliary capacitance line drive signal applied to the second-row auxiliary capacitance line C2, the auxiliary capacitance start pulse signal FSP, and the polarity signal PP. Note that the voltage of the drive video signal will also be referred to below as the "source voltage".

Firstly, descriptions will be given as to how FIGS. 1 and 8 are referenced and characters are assigned therein.

Figure 9:
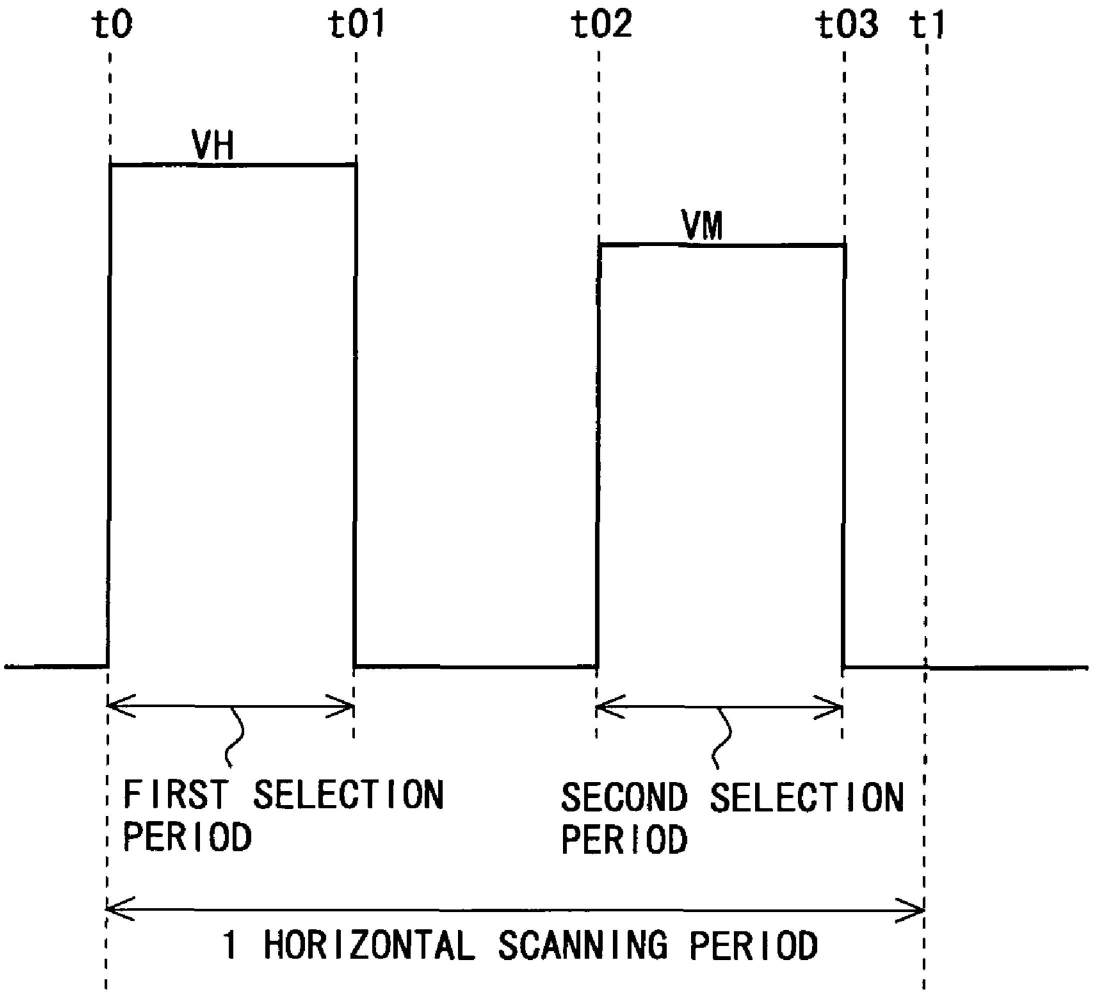
FIG. 9 is a diagram describing the manner by which characters are assigned to time points in the first embodiment.

The manner in which the characters are assigned to time points within a period from time point t0 to time point t1 in FIG. 1A (the manner how the time points are represented) will be described with reference to FIG. 9. As shown in FIG. 9, the first-row gate line G1 is selected twice during one horizontal scanning period from time point t0 to time point t1. Here, the end point of the first selection period is denoted by "t01". Also, the start point of the second selection period is denoted by "t02", and the end point thereof is denoted by "t03". Similarly, as for a period from time point t1 to time point t2, the end point of the first selection period is denoted by "t11", the start point of the second selection period is denoted by "t12", and the endpoint of the second selection period is denoted by "t13". This applies similarly to time point t2 and subsequent time points. Specifically, for a period from time point to (a is an integer) to time point t (a+1), the end point of the first selection period is denoted by "ta1", the start point of the second selection period is denoted by "ta2", and the end point of the second selection period is denoted by "ta3". Note that a period from time point t0 to time point t1 corresponds to a scanning signal line selection period for the first-row gate line G1, a period from time point t1 to time point t2 corresponds to a scanning signal line selection period for the second-row gate line G2, a period from time point t2 to time point t3 corresponds to a scanning signal line selection period for the third-row gate line G3, and a period from time point t3 to time point t4 corresponds to a scanning signal line selection period for the fourth-row gate line G4.

Each line in FIG. 1E has its meaning as described below. The wide solid line indicates the waveform of a source voltage Sj corresponding to an input signal Dx with a tone value of "63". The wide dotted line indicates the waveform of a source voltage Sj corresponding to an input signal Dx with a tone value of "42". The narrow solid line indicates the waveform of a source voltage Sj corresponding to an input signal Dx with a tone value of "21". The narrow dotted line indicates the waveform of a source voltage Sj corresponding to an input signal Dx with a tone value of "0". Also, "VSH" denotes a source maximum voltage, "VSL" denotes a source minimum voltage, and "VSM" denotes a source intermediate voltage. Note that "maxVS" in FIG. 5 corresponds to "VSH" in FIG. 1E, and "minVS" in FIG. 5 corresponds to "VSL" in FIG. 1E.

Figure 10A:
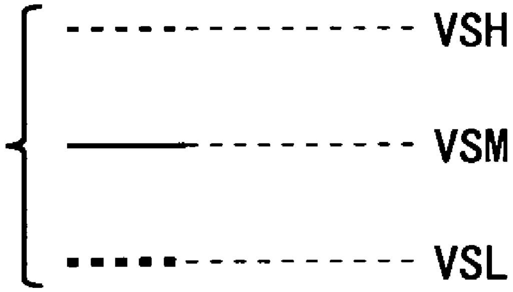
FIGS. 10A to 10D are diagrams describing a source voltage in the first embodiment.
Figure 10B:
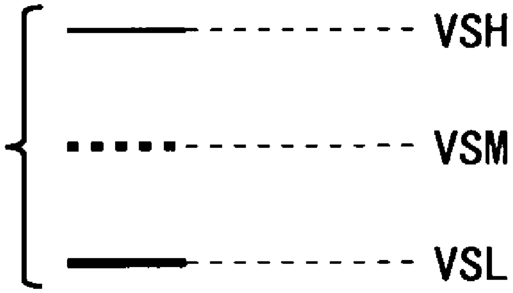
Figure 10C:
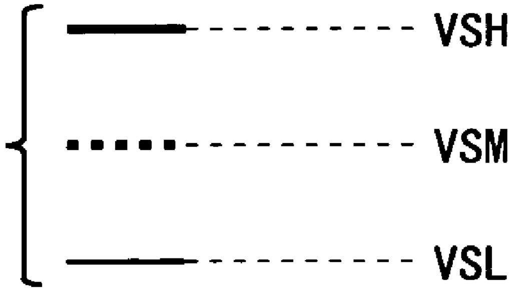
Figure 10D:
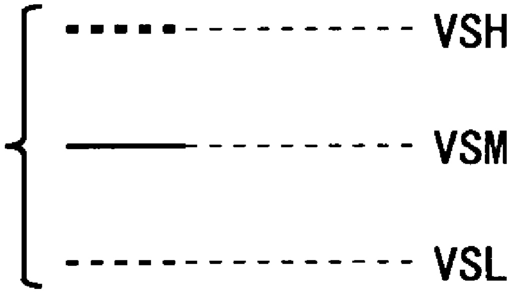

In FIG. 1, for example, in a period from time point t0 to time point t01, the source voltage Sj is as shown in FIG. 10A. This indicates that an input signal Dx with a tone value of "0" is converted into the source maximum voltage VSH, an input signal Dx with a tone value of "21" is converted into the source intermediate voltage VSM, and an input signal Dx with a tone value of "42" is converted into the source minimum voltage VSL. Also, in a period from time point t02 to time point t03, the source voltage Sj is as shown in FIG. 10B. This indicates that an input signal Dx with a tone value of "21" or less is converted into the source maximum voltage VSH, an input signal Dx with a tone value of "42" is converted into the source intermediate voltage VSM, and an input signal Dx with a tone value of "63" is converted into the source minimum voltage VSL. Furthermore, in a period from time point t1 to time point t11, the source voltage Sj is as shown in FIG. 10C. This indicates that an input signal Dx with a tone value of "63" is converted into the source maximum voltage VSH, an input signal Dx with a tone value of "42" is converted into the source intermediate voltage VSM, and an input signal Dx with a tone value of "21" is converted into the source minimum voltage VSL. Further still, in a period from time point t12 to time point t13, the source voltage Sj is as shown in FIG. 10D. This indicates that an input signal Dx with a tone value of "42" or more is converted into the source maximum voltage VSH, an input signal Dx with a tone value of "21" is converted into the source intermediate voltage VSM, and an input signal Dx with a tone value of "0" is converted into the source minimum voltage VSL.

Next, a method for driving the first row of the pixel matrix will be described.

During a period from time point t0 to time point t01, a first selection voltage VH is applied to the first-row gate line G1. As a result, the TFT 20 of the pixel formation portion A1*j* is rendered conductive. Also, during this period, the polarity signal PP is at low level and the output voltage control signal AB is at low level. Accordingly, as shown in FIG. 5, when a tone value of the input signal Dx is from "0" to "42", a voltage corresponding to each tone value between the source maximum voltage maxVS (VSH) and the source minimum voltage minVS(VSL) is applied to the source line Sj, and when a tone value of the input signal is from "43" to "63", the source minimum voltage minVS is applied to the source line Sj.

Incidentally, threshold characteristics of the TFTs 20 vary among themselves. Accordingly, it is assumed that the threshold voltage Vth of the TFTs 20 included in the display portion 200 varies within the range from minVth (minimum) to maxVth (maximum). In this case, the first selection voltage VH and the source maximum voltage VSH are set such that equation (16) below is established.

$$VH-\max Vth>VSH \quad (16)$$

Figures 8A, 8B, 8C, 8D, 8E, 8F:
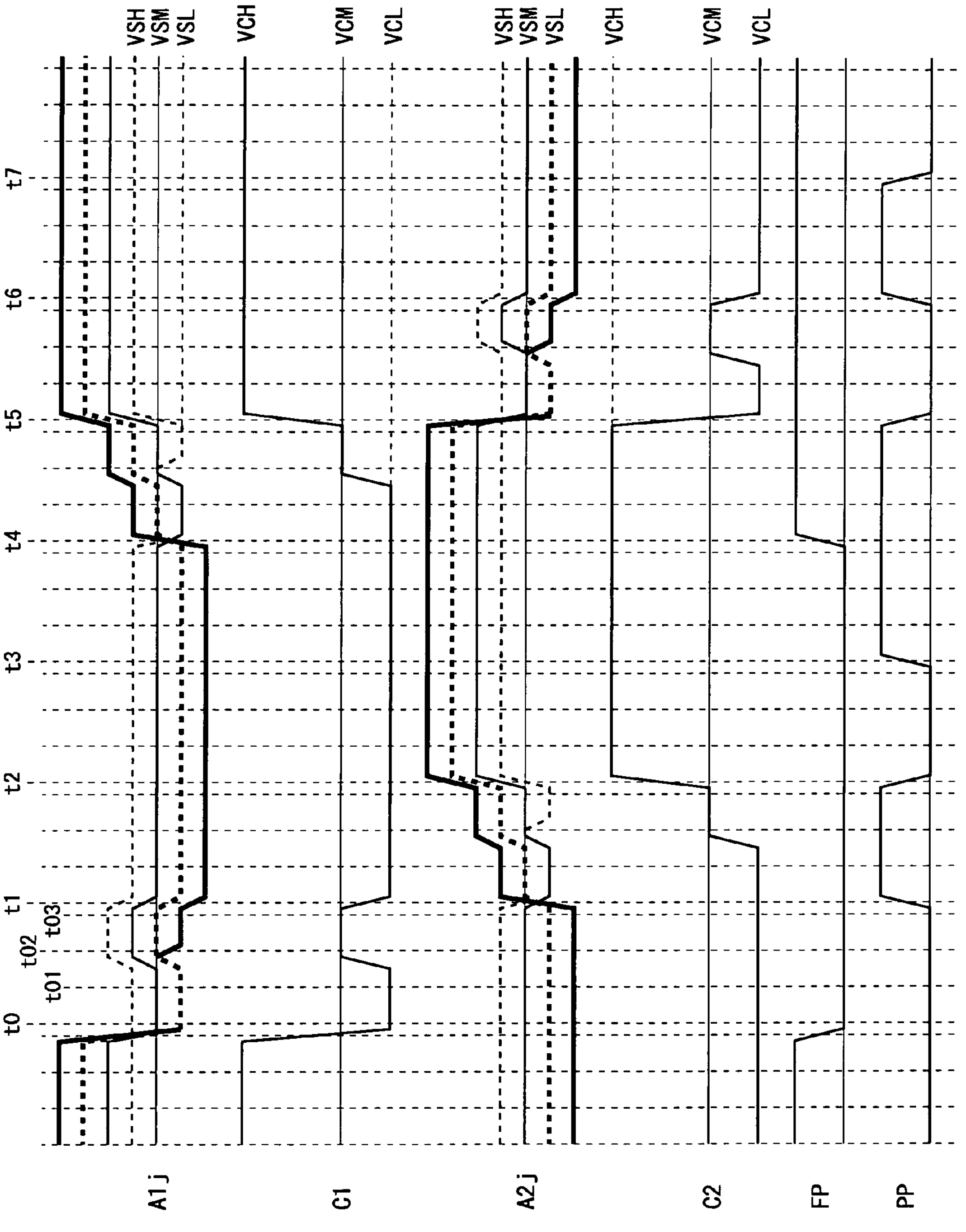
FIGS. 8A to 8F are signal waveform diagrams describing a drive method in the first embodiment.

As a result, it is ensured that a voltage between the gate and the source of a TFT 20 is greater than the threshold voltage of the TFT 20. Consequently, as shown in FIG. 8A, the voltages VSH to VSL supplied to the source line Sj are applied to the pixel electrode P1j of the pixel formation portion A1j. Note that during this period, as shown in FIG. 8B, the voltage VCL is applied to the first-row auxiliary capacitance line C1.

During a period from time point t01 to time point t02, a deselection voltage VL is applied to the first-row gate line G1. As a result, the TFT 20 of the pixel formation portion A1j is rendered non-conductive. Then, during this period, the voltage on the first-row auxiliary capacitance line C1 increases from VCL to VCM. Here, when it is assumed that the liquid crystal capacitance 22 has a capacity of Clc, and the auxiliary capacitance 23 has a capacity of Cs, voltages are set such that equation (17) below is established.

$$VSH=VSM+(VCM-VCL)\times Cs/(Cs+Clc) \quad (17)$$

Thus, the amount of voltage change ΔVP of the pixel electrode P1j is represented by:

$$\Delta VP=(VCM-VCL)\times Cs/(Cs+Clc) \quad (18).$$

During time point t02 to time point t03, the second selection voltage VM is applied to the first-row gate line G1. In this case, voltages are set such that equations (19) and (20) below are established.

$$VM-\min Vth<VSH \quad (19)$$

$$VM-\max Vth>VSM \quad (20)$$

Also, during this period, the polarity signal PP is at low level, and the output voltage control signal AB is at high level. Accordingly, as shown in FIG. 5, the source maximum voltage maxVS is applied to the source line Sj when a tone value of the input signal Dx is from "0" to "20", and voltages corresponding to each tone value between the source maximum voltage maxVS and the source minimum voltage minVS are applied to the source line Sj when a tone value of the input signal Dx is from "21" to "63".

In this manner, for any pixel formation portion A1j including the pixel electrode P1j to which any one of the voltages VSH to VSM corresponding to tone values from "0" to "20" is applied during the first selection period, the source maximum voltage VSH is applied to the source line Sj during the second selection period, thereby rendering the TFT 20 non-conductive. As a result, in the pixel formation portion A1j, the pixel electrode voltage is maintained at a level raised during the period from time point t01 to time point t02. Also, as for any pixel formation portion A1j including the pixel electrode P1j to which any one of the voltages VSM to VSL corresponding to tone values from "21" to "42" is applied during the first selection period, a voltage from "VSM+ΔVP" to "VSL+ΔVP", i.e., from the source maximum voltage VSH to the source intermediate voltage VSM, is applied to the source line Sj during the second selection period. As a result, in the pixel formation portion A1j, the pixel electrode voltage is maintained at a level raised during the period from time point t01 to time point t02, regardless of whether or not the TFT 20 of the pixel formation portion A1j is rendered conductive. Furthermore, as for any pixel formation portion A1j including the pixel electrode P1j to which the source minimum voltage VSL is applied as a voltage corresponding to a tone value from "43" to "63" during the first selection period, any one of the voltages VSM to VSL corresponding to tone values from "43" to "63" is applied to the source line Sj during the second selection period. As a result, the TFT 20 of the pixel formation portion A1j is rendered conductive, and in the pixel formation portion A1j, any one of the voltages VSM to VSL is applied to the pixel electrode P1j.

During a period after time point t03 and before/after time point t1, the voltage of the first-row auxiliary capacitance line C1 falls from VCM to VCL. During this period, the deselection voltage VL is applied to the first-row gate line G1. As a result, the TFT 20 of the pixel formation portion A1j is rendered non-conductive, and therefore in the pixel formation portion A1j, the pixel electrode voltage falls by ΔVP. Consequently, the pixel electrode voltage is from VSH to "VSL−ΔVP". Thereafter, during a period up to time point t4, the deselection voltage VL is applied to the first-row gate line G1 as well. In addition, throughout this period, the voltage on the first-row auxiliary capacitance line C1 is maintained at VCL. Therefore, in the first-row pixel formation portion A1j, the pixel electrode voltage at time point t03 is maintained until time point t4.

Next, a method for driving the second row of the pixel matrix will be described.

During a period form time point t1 to time point t11, the first selection voltage VH is applied to the second-row gate line G2. As a result, the TFT 20 of the pixel formation portion A2j is rendered conductive. Also, during this period, the polarity signal PP is at high level, and the output voltage control signal AB is at low level. Accordingly, as shown in FIG. 5, the source minimum voltage minVS is applied to the source line Sj when a tone value of the input signal Dx is from "0" to "20", and a voltage corresponding to each tone value between the source minimum voltage minVS and the source maximum voltage maxVS is applied to the source line Sj when a tone value of the input signal Dx is from "21" to "63". Note that during this period, as shown in FIG. 8D, the voltage VCL is applied to the second-row auxiliary capacitance line C1.

During a period from time point t11 to time point t12, a deselection voltage VL is applied to the second-row gate line G2. As a result, the TFT 20 of the pixel formation portion A2j is rendered non-conductive. Then, during this period, the voltage on the second-row auxiliary capacitance line C2 rises from VCL to VCM. Accordingly, the voltage on the pixel electrode P2j rises by ΔVP.

During a period from time point t12 to time point t13, a second selection voltage VM is applied to the second-row gate line G2. Also, during this period, the polarity signal PP is at high level and the output voltage control signal AB is at high level. Accordingly, as shown in FIG. 5, a voltage corresponding to each tone value between the source minimum voltage minVS and the source maximum voltage maxVS is applied to the source line Sj when a tone value of the input signal Dx is from "0" to "42", and the source maximum voltage maxVS is applied to the source line Sj when a tone value of the input signal Dx is from "43" to "63".

In this manner, as for any pixel formation portion A2j including the pixel electrode P2j to which any one of the voltages VSM to VSH corresponding to tone values from "43" to "63" is applied during the first selection period, the source maximum voltage VSH is applied to the source line Sj during the second selection period, thereby rendering the TFT 20 non-conductive. As a result, in the pixel formation portion A2j, the pixel electrode voltage is maintained at a level raised during the period from time point t01 to time point t02. Also, as for any pixel formation portion A2j including the pixel electrode P2j to which any one of the voltages VSL to VSM corresponding to tone values from "21" to "42" is applied during the first selection period, a voltage from the source intermediate voltage VSM through the source maximum voltage VSH is applied to the source line Sj during the second selection period. As a result, in the pixel formation portion A2j, the pixel electrode voltage is maintained at a level raised during the period from time point t01 to time point t02, regardless of whether or not the TFT 20 of the pixel formation portion A2j is rendered conductive. Furthermore, as for any pixel formation portion A2j including the pixel electrode P2j to which the source minimum voltage VSL is applied as a voltage corresponding to a tone value from "0" to "20" during the first selection period, any one of the voltages VSL to VSM corresponding to tone values from "0" to "20" is applied to the source line Sj during the second selection period. As a result, the TFT 20 of the pixel formation portion A2j is rendered conductive, and in the pixel formation portion A2j, any one of the voltages VSL to VSM is applied to the pixel electrode P2j.

During a period after time point t13 and before/after time point t2, the voltage of the second-row auxiliary capacitance line C2 rises from VCM to VCH. During this period, the deselection voltage VL is applied to the second-row gate line G2. Accordingly, the TFT 20 of the pixel formation portion A2j is non-conductive, and therefore in the pixel formation portion A2j, the pixel electrode voltage changes (rises). Here, when the pixel electrode voltage at the endpoint (time point t13) of the second selection period is VSL, the pixel electrode voltage VSLP after change (rise) is such that:

$$VSLP=VSL+(VCH-VCM)\times Cs/(Cs+Clc) \quad (21).$$

Here, in the present embodiment, the voltage VCH in equation (21) is set such that equation (22) below is established.

$$VSLP \geqq VSH \quad (22)$$

As a result, in FIG. 8C, the minimum voltage of the pixel electrode P2j after time point t2 (the minimum voltage of the pixel electrode voltage with positive polarity) is greater than the maximum voltage of the pixel electrode P2j before time point t1 (the maximum voltage of the pixel electrode voltage with negative polarity). Moreover, the voltage Vc on the common electrode 24 is set such that equation (23) below is established.

$$Vc=(VSLP+VSH)/2 \quad (23)$$

Specifically, the voltage Vc on the common electrode 24 is set to an intermediate voltage between "the maximum voltage of the pixel electrode voltage with negative polarity" and "the minimum voltage of the pixel electrode voltage with positive polarity". As a result, alternate-current voltage is applied to the liquid crystal without subjecting the common electrode 24 to alternate-current drive.

2.6 Effect

According to the present embodiment, a period (scanning signal line selection period) in which each gate line is selected includes the first selection period and the second selection period. During the first selection period, all TFTs 20 included in a selected row are rendered conductive. As a result, all pixel electrodes included in the selected row are supplied with a source voltage applied to the source line. Also, during a period between the first selection period and the second selection period, all the TFTs 20 included in the selected row are rendered non-conductive, so that the voltage of the auxiliary capacitance line is changed during the period. As a result, the voltage of all the pixel electrodes included in the selected row is changed in accordance with the change of the voltage of the auxiliary capacitance line. Furthermore, during the second selection period, a part of the TFTs 20 included in the selected row are rendered conductive. As a result, the source voltage applied to the source line is supplied only to pixel electrodes corresponding to the conductive TFTs 20.

In this manner, the range of the voltage applied to the pixel electrodes is broadened by "the amount of change caused by the change of the voltage on the auxiliary capacitance line" compared to the range of the source voltage applied to the source line. That is, the amplitude of the pixel electrode voltage can be greater than the amplitude of the source voltage. Accordingly, it is possible to employ liquid crystal (display elements) with an increased difference between the minimum tone voltage and the maximum tone voltage, while keeping the amplitude of the source voltage the same as conventional. As a result, low-viscosity liquid crystal with an increased response speed can be employed, making it possible to increase display quality for displaying moving images, for example.

Also, in the case where liquid crystal (display elements) is employed while keeping the difference between the minimum tone voltage and the maximum tone voltage the same as conventional, it is possible to narrow the amplitude of the source voltage as compared to the conventional amplitude, and therefore power consumption can be reduced. Furthermore, input signals in the range from the minimum tone value (tone value of "0") to the maximum tone value (tone value of "63") are converted into different voltages, and therefore gradation display does not deteriorate.

2.7 Variants

Incidentally, according to the first embodiment, direct-current (DC) components occur in the voltage applied to the liquid crystal during each selection period, as described below. According to FIGS. 1 and 5 to 8, the pixel electrode voltage during each selection is shown in FIG. 11. In FIG. 11, for example, the column denoted by character b1 indicates that, when the logic level of the auxiliary capacitance start pulse signal FSP is "low level", the logic level of the i'th-row timing pulse GSi in the gate driver 400 is "high level", and the logic level of the output voltage control signal AB is "low level", the voltage of the pixel electrode Pij in the pixel formation portion Aij for which the input signal Dx has a tone value of "0" is "VSH", the voltage of the pixel electrode Pij in the pixel formation portion Aij for which the input signal Dx has a tone value of "21" is "VSM", the voltage of the pixel electrode Pij in the pixel formation portion Aij for which the input signal Dx has a tone value of "42" is "VSL", and the voltage of the pixel electrode Pij in the pixel formation portion Aij for which the input signal Dx has a tone value of "63" is "VSL".

Here, if "VSH=VSLP", the common electrode voltage Vc is VSH according to equation (23). Also, if "VSH−VSM=VSM−VSL=ΔVP", $$(VSH+\Delta VP)-Vc=\Delta VP,$$

$$VSH-Vc=0,$$

$$VSM-Vc=-\Delta VP, \text{ and}$$

$$VSL-Vc=-2\Delta VP.$$

Thus, voltages applied to liquid crystal during the selection periods are as shown in FIG. 12. According to FIG. 12, it can be appreciated that the voltages applied to liquid crystal during the selection periods are generally negative in polarity. Thus, with first and second variants to be described below, it is possible to prevent the above-described imbalance toward direct-current (DC) components.

2.7.1 First Variant

Figures 13A, 13B, 13C, 13D, 13E, 13F:
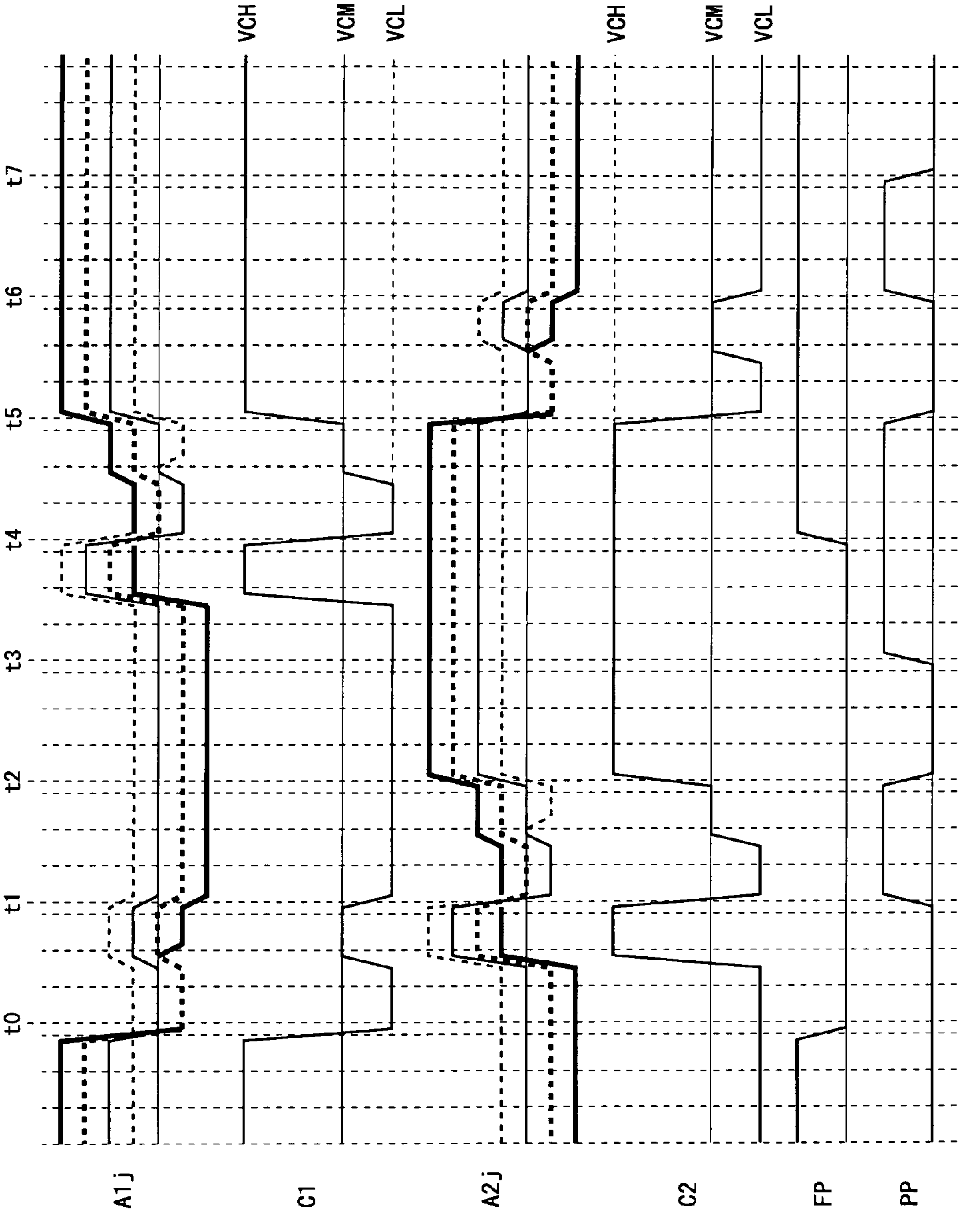
FIGS. 13A to 13F are signal waveform diagrams describing a drive method in a first variant of the first embodiment.

FIGS. 13A to 13F are signal waveform diagrams describing a drive method in a first variant of the first embodiment. In the present variant, the voltage on the first-row auxiliary capacitance line C1 and the voltage on the second-row auxiliary capacitance line C2 rise from VCL to VCH, respectively, during a period from time point t32 to time point t33 and during a period from time point t02 to time point t03. Specifically, during a period (deselection period) immediately before the selection period starts for each row, the voltage on the auxiliary capacitance line in the row rises from VCL to VCH. As a result, during a period in which the voltage on the auxiliary capacitance line rises, the pixel electrode voltage rises as shown in FIGS. 13A and 13C, so that the aforementioned imbalance toward direct-current components is prevented.

2.7.2 Second Variant

Figure 14:
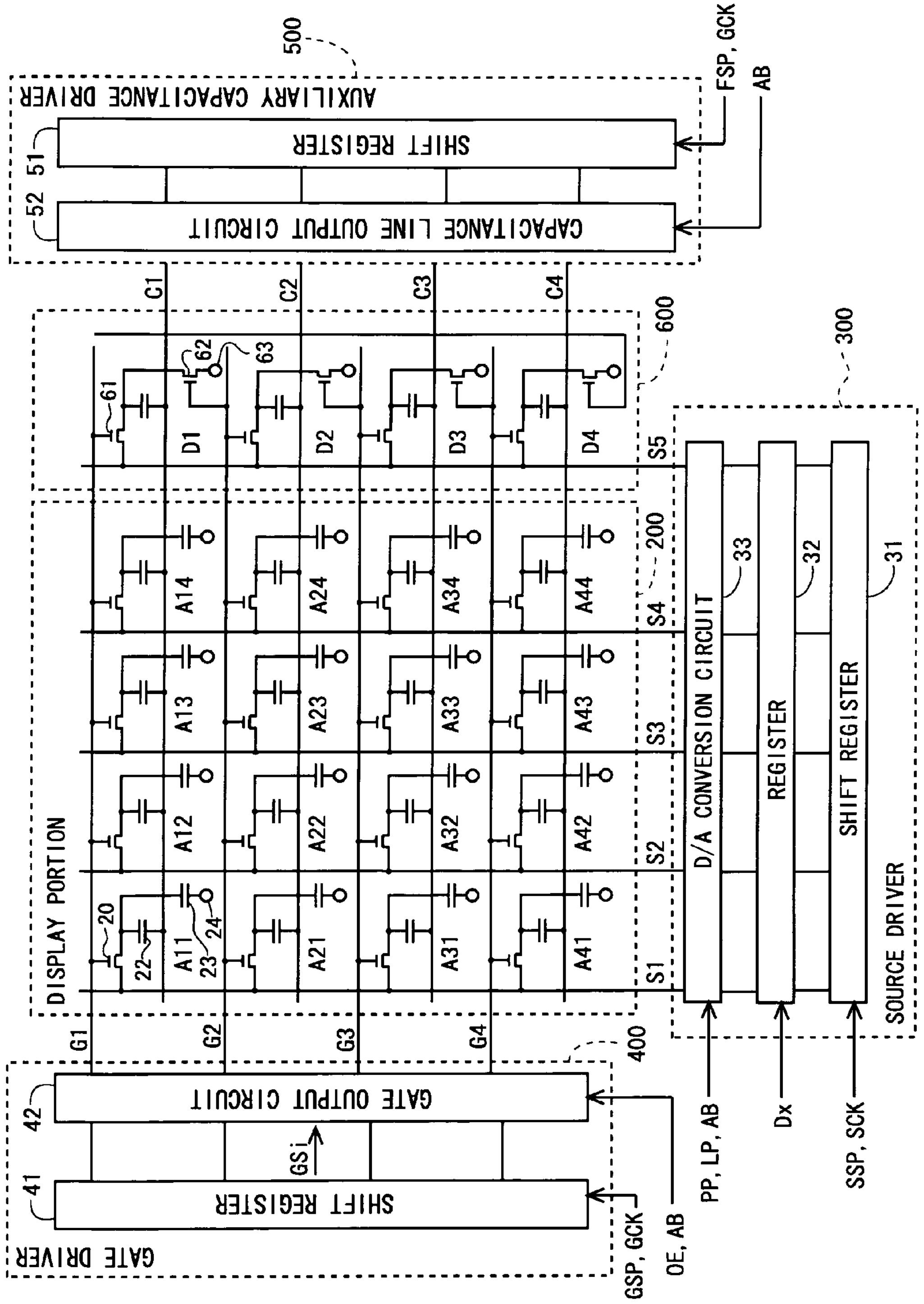
FIG. 14 is a block diagram illustrating configurations of drivers and a display portion in a second variant of the first embodiment.

FIG. 14 is a block diagram illustrating configurations of drivers and a display portion 200 in a second variant of the first embodiment. In the present variant, as shown in FIG. 14, an area (hereinafter, the area is referred to as the “dummy pixel area”, and each pixel formation portion in the area is referred to as a “dummy pixel formation portion”) 600 is provided in which a pixel formation portion group not used for displaying an image is formed. Dummy pixel formation portions D1 to D4 are each provided with a first TFT 61 and a second TFT 62. The first TFT 61 has a gate electrode connected to a gate line G1 passing through its corresponding intersection, a source electrode connected to a source line S5 passing through the intersection, and a drain electrode connected to a pixel electrode Pi5. On the other hand, the second TFT 62 has a gate electrode connected to an auxiliary capacitance line in a row next to the row corresponding to the second TFT 62, a source electrode connected to the pixel electrode Pi5, and a drain electrode connected to a line (hereinafter, referred to as a “dummy common electrode line”) 63 electrically connectable to the common electrode 24.

In the above-described configuration, the pixel electrodes Pi5 in the dummy pixel formation portions D1 to D4 are always supplied with a voltage corresponding to the maximum tone value (or the minimum tone value). In addition, an average (intermediate voltage) of the voltages applied to the pixel electrodes Pi5 is obtained, thereby determining the voltage Vc to be applied to the common electrode 24. Here, the second TFTs 62 are sequentially turned ON, thereby directing charge in the dummy pixel formation portions D1 to D4 to the dummy common electrode line 63, so that the voltage on the dummy common electrode line 63 is equalized to the intermediate voltage. Moreover, the dummy common electrode line 63 and the common electrode 24 are short-circuited, or a buffer is provided between the dummy common electrode line 63 and the common electrode 24, thereby subjecting the voltage on the dummy common electrode line 63 to impedance conversion, so that the voltage on the common electrode 24 is set to a desired intermediate voltage.

3. Second Embodiment

Figure 15:
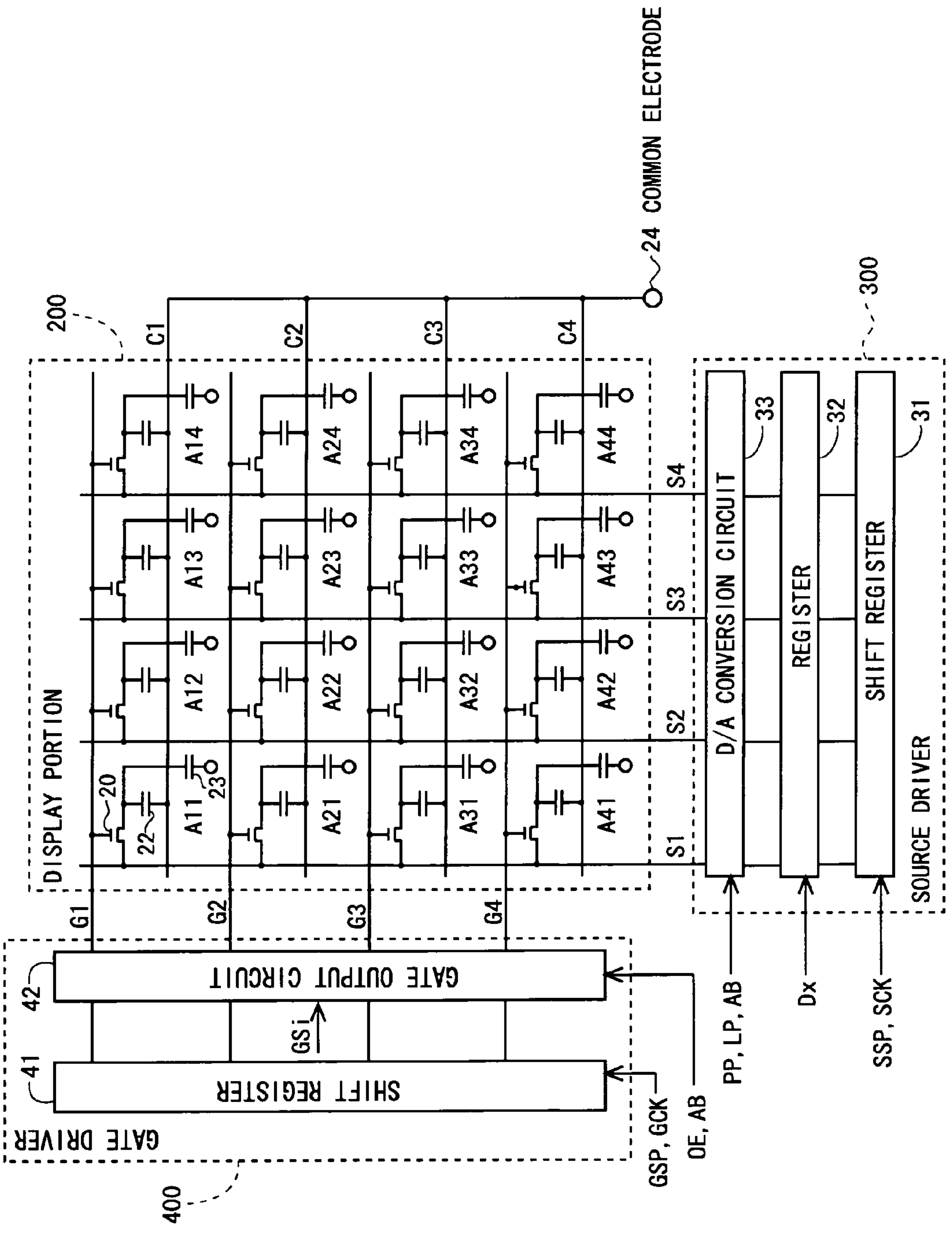
FIG. 15 is a block diagram illustrating configurations of drivers and a display portion in a liquid crystal display device according to a second embodiment of the present invention.

FIG. 15 is a block diagram illustrating configurations of drivers and a display portion 200 in a liquid crystal display device according to a second embodiment of the present invention. In the present embodiment, unlike in the first embodiment, all auxiliary capacitance lines Ck are electrically connected to the common electrode 24. Accordingly, no auxiliary capacitance driver 500 is provided.

Figures 16A, 16B, 16C, 16D:
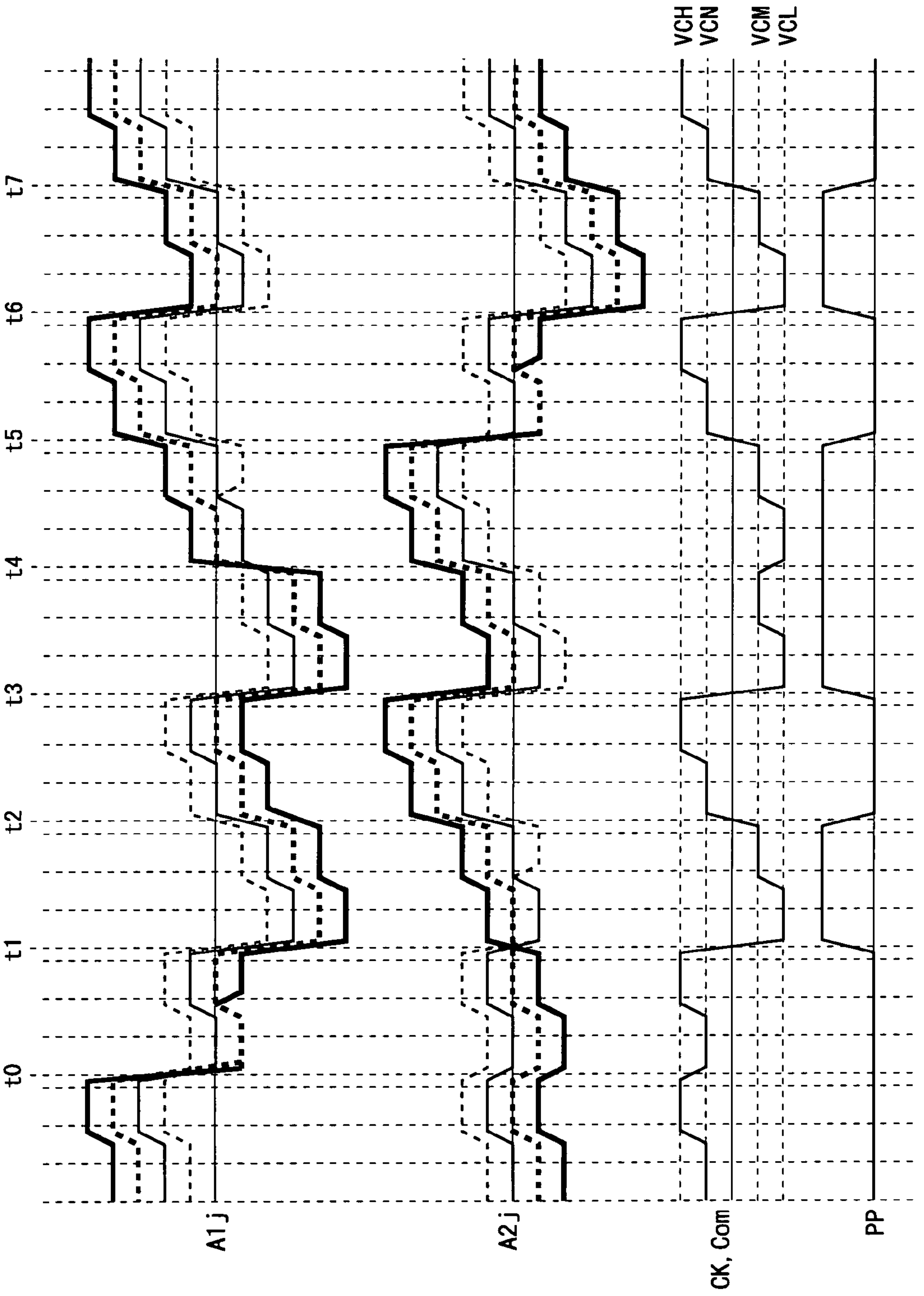
FIGS. 16A to 16D are signal waveform diagrams describing a drive method in the second embodiment.

FIGS. 16A to 16D are signal waveform diagrams describing a drive method in the present embodiment. In the present embodiment, since all auxiliary capacitance lines Ck are electrically connected to the common electrode 24, as described above, the voltage of the common electrode 24 and the voltages of the auxiliary capacitance lines Ck change in the same manner, as shown in FIG. 16C. Note that as in the first embodiment, the waveform of the selection signal applied to the gate line G1, the waveform of the drive video signal applied to the source line Sj, and the waveform of the output voltage control signal AB are as shown in FIG. 1.

Firstly, a method for driving the first row of a pixel matrix will be described.

During a period from time point t0 to time point t01, a first selection voltage VH is applied to the first-row gate line G1. As a result, the TFT 20 of the pixel formation portion A1*j* is rendered conductive. Also, during this period, the polarity signal PP is at low level, and the output voltage control signal AB is at low level. Accordingly, as shown in FIG. 5, a voltage corresponding to each tone value between the source maximum voltage maxVS and the source minimum voltage minVS is applied to the source line Sj when a tone value of the input signal Dx is from “0” to “42”, and the source minimum voltage minVS is applied to the source line Sj when a tone value of the input signal Dx is from “43” to “63”. Also, a predetermined voltage VCN is applied to the auxiliary capacitance line Ck and the common electrode 24.

During a period from time point t01 to time point t02, a deselection voltage VL is applied to the first-row gate line G1. As a result, the TFT 20 of the pixel formation portion A1*j* is rendered non-conductive. Moreover, during this period, the voltages of the auxiliary capacitance line Ck and the common electrode 24 rise from VCN to VCH. Note that for ease of description, it is assumed here that the pixel electrode Pij is capacitively coupled only to the auxiliary capacitance line Ck and the common electrode 24, so that capacitance coupling of the pixel electrode Pij with the source line Sj and capacitance coupling of the pixel electrode Pij with the gate line G1 are not considered.

As described above, the TFT 20 of the pixel formation portion A1*j* is non-conductive, and therefore, when the voltages of the auxiliary capacitance line Ck and the common electrode 24 rise from VCN to VCH, the voltage of the pixel electrode P1*j* rises by “VCH−VCN”. Note that the voltages are set such that equation (24) below is established.

$$VSH=VSM+(VCH-VCN) \qquad (24)$$

As a result, the amount of voltage change ΔVP of the pixel electrode P1*j* is set to:

$$\Delta VP=VCH-VCN \qquad (25).$$

During a period from time point t02 to time point t03, a second selection voltage VM is applied to the first-row gate line G1. Also, during this period, the polarity signal PP is at low level, and the output voltage control signal AB is at high level. Accordingly, as shown in FIG. 5, the source maximum voltage maxVS is applied to the source line Sj when a tone value of the input signal Dx is from “0” to “20”, and a voltage corresponding to each tone value between the source maximum voltage maxVS and the source minimum voltage minVS is applied to the source line Sj when a tone value of the input signal Dx is from "21" to "63".

In this manner, as for any pixel formation portion A1*j* including the pixel electrode P1*j* to which any one of the voltages VSH to VSM corresponding to tone values from "0" to "20" is applied during the first selection period, the source maximum voltage VSH is applied to the source line Sj during the second selection period, thereby rendering the TFT 20 non-conductive. As a result, in the pixel formation portion A1*j*, the pixel electrode voltage is maintained at a level raised during the period from time point t01 to time point t02. Also, as for any pixel formation portion A1*j* including the pixel electrode P1*j* to which any one of the voltages VSM to VSL corresponding to tone values from "21" to "42" is applied during the first selection period, a voltage from "VSM+ΔVP" to "VSL+ΔVP", i.e., from the source maximum voltage VSH to the source intermediate voltage VSM, is applied to the source line Sj during the second selection period. As a result, in the pixel formation portion A1*j*, the pixel electrode voltage is maintained at a level raised during the period from time point t01 to time point t02, regardless of whether or not the TFT 20 of the pixel formation portion A1*j* is rendered conductive. Furthermore, as for any pixel formation portion A1*j* including the pixel electrode P1*j* to which the source minimum voltage VSL is applied as a voltage corresponding to a tone value from "43" to "63" during the first selection period, any one of the voltages VSM to VSL corresponding to tone values from "43" to "63" is applied to the source line Sj during the second selection period. As a result, the TFT 20 of the pixel formation portion A1*j* is rendered conductive, and in the pixel formation portion A1*j*, any one of the voltages VSM to VSL is applied to the pixel electrode P1*j*.

Next, a method for driving the second row of the pixel matrix will be described.

During a period from time point t1 to time point t11, a first selection voltage VH is applied to the second-row gate line G2. As a result, the TFT 20 of the pixel formation portion A2*j* is rendered conductive. Also, during this period, the polarity signal PP is at high level, and the output voltage control signal AB is at low level. Accordingly, as shown in FIG. 5, the source minimum voltage minVS is applied to the source line Sj when a tone value of the input signal Dx is from "0" to "20", and a voltage corresponding to each tone value between the source minimum voltage minVS and the source maximum voltage maxVS is applied to the source line Sj when a tone value of the input signal Dx is from "21" to "63". Also, a predetermined voltage VCL is applied to the auxiliary capacitance line Ck and the common electrode 24.

During a period from time point t11 to time point t12, a deselection voltage VL is applied to the second-row gate line G2. As a result, the TFT 20 of the pixel formation portion A2*j* is rendered non-conductive. Moreover, during this period, the voltages of the auxiliary capacitance line Ck and the common electrode 24 rise from VCL to VCM. As a result, the voltage of the pixel electrode P2*j* rises by "VCM−VCL". Note that the voltages are set such that equation (26) below is established.

$$VSH=VSM+(VCM-VCL) \tag{26}$$

As a result, the amount of voltage change ΔVP of the pixel electrode P2*j* is set to:

$$\Delta VP=VCM-VCL \tag{27}.$$

According to equations (25) and (27) above, "VCH−VCN=VCM−VCL".

During a period from time point t12 to time point t13, a second selection voltage VM is applied to the second-row gate line G2. Also, during this period, the polarity signal PP is at high level, and the output voltage control signal AB is at high level. Accordingly, as shown in FIG. 5, a voltage corresponding to each tone value between the source minimum voltage minVS and the source maximum voltage maxVS is applied to the source line Sj when a tone value of the input signal Dx is from "0" to "42", and the source maximum voltage maxVS is applied to the source line Sj when a tone value of the input signal Dx is from "43" to "63".

In this manner, as for any pixel formation portion A2*j* including the pixel electrode P2*j* to which any one of the voltages VSM to VSH corresponding to tone values from "43" to "63" is applied during the first selection period, the source maximum voltage VSH is applied to the source line Sj during the second selection period, thereby rendering the TFT 20 non-conductive. As a result, in the pixel formation portion A2*j*, the pixel electrode voltage is maintained at a level raised during the period from time point t11 to time point t12. Also, as for any pixel formation portion A2*j* including the pixel electrode P2*j* to which any one of the voltages VSL to VSM corresponding to tone values from "21" to "42" is applied during the first selection period, a voltage from the source intermediate voltage VSM to the source maximum voltage VSH is applied to the source line Sj during the second selection period. As a result, in the pixel formation portion A2*j*, the pixel electrode voltage is maintained at a level raised during the period from time point t11 to time point t12, regardless of whether or not the TFT 20 of the pixel formation portion A2*j* is rendered conductive. Furthermore, as for any pixel formation portion A2*j* including the pixel electrode P2*j* to which the source minimum voltage VSL is applied as a voltage corresponding to a tone value from "0" to "20" during the first selection period, any one of the voltages VSL to VSM corresponding to tone values from "0" to "20" is applied to the source line Sj during the second selection period. As a result, the TFT 20 of the pixel formation portion A2*j* is rendered conductive, and in the pixel formation portion A2*j*, any one of the voltages VSL to VSM is applied to the pixel electrode P2*j*.

Incidentally, the voltages of the auxiliary capacitance line Ck and the common electrode 24 fall from VCH to VCL during a period either before or after time point t1. Accordingly, when it is assumed that the voltage of the pixel electrode P1*j* is VS2 at the end point (time point t03) of the second selection period for the first row, the voltage VSx of the pixel electrode P1*j* during the first selection period (period from time point t1 to time point t11) for the second row is such that:

$$VSx=VS2+(VCL-VCH) \tag{28}.$$

Here, VS2 is a voltage within the range from VSL to "VSH+ΔVP", and therefore, according to equation (28) above, the minimum voltage min(VSx) of the pixel electrode P1*j* is such that:

$$\min(VSx)=VSL+(VCL-VCH) \tag{29}.$$

Here, in the pixel formation portion A1*j*, the TFT 20 has to be rendered non-conductive during the deselection period, even when a low voltage is applied to the drain electrode of the TFT 20. Specifically, even when the minimum voltage min(VSx) is applied to the pixel electrode P1*j*, the TFT 20 of the pixel formation portion A1*j* has to be rendered non-conductive. Accordingly, in accordance with equation (29) above, the voltage applied to the gate line G1 during the deselection period, i.e., the deselection voltage VL, is set to "VSL+(VCL−VCH)" or lower.

In this manner, in the present embodiment, the deselection voltage VL is set to be relatively low, and the amplitude of the output voltage from the gate driver 400 is relatively broad. Therefore, power consumption increases as compared to the first embodiment. On the other hand, in the present embodiment, no auxiliary capacitance driver 500 is required as described above, so cost reduction is achieved as compared to the first embodiment.

4. Third Embodiment

Figure 17:
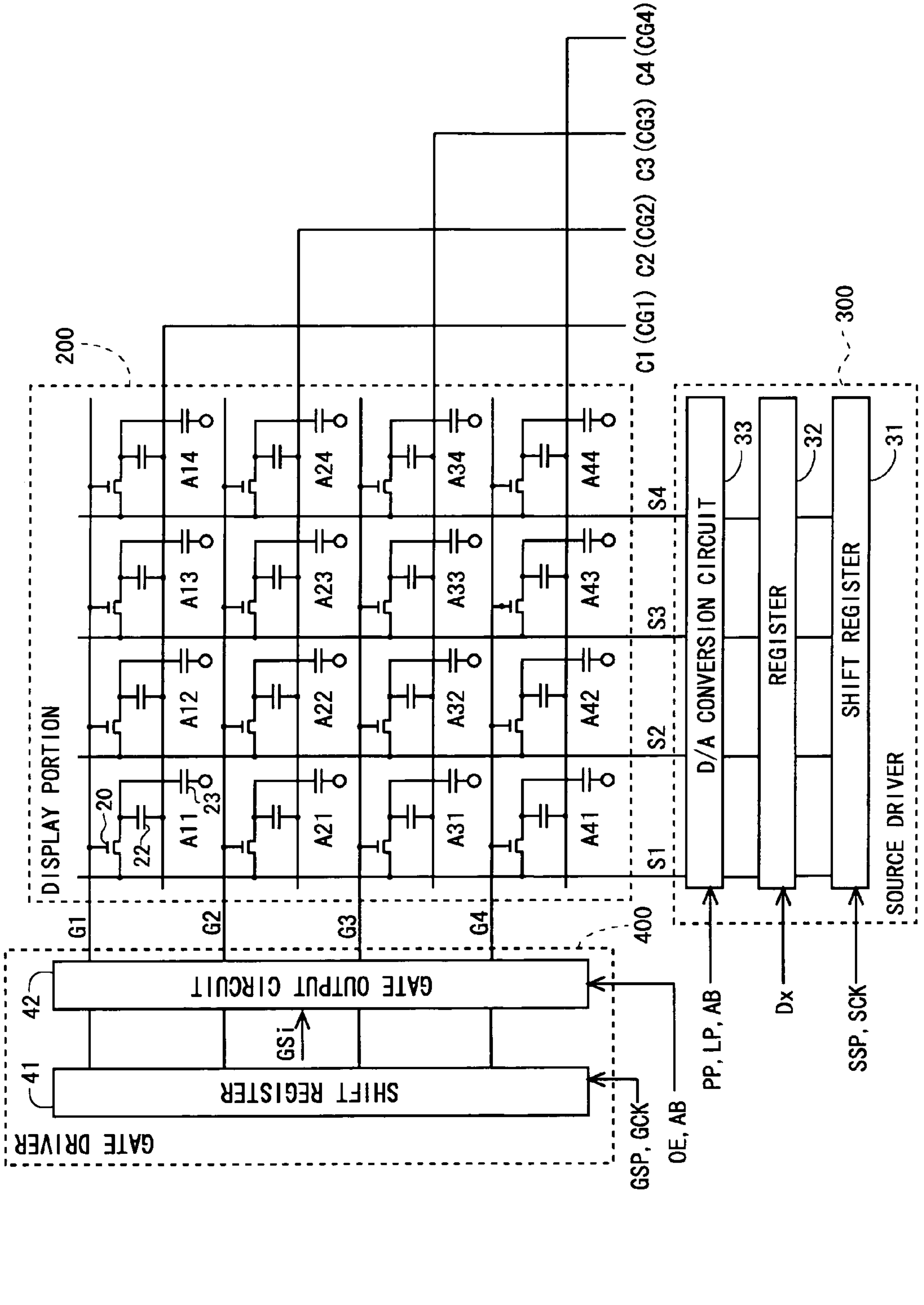
FIG. 17 is a block diagram illustrating the configurations of drivers and a display portion in a liquid crystal display device according to a third embodiment of the present invention.
Figure 18:
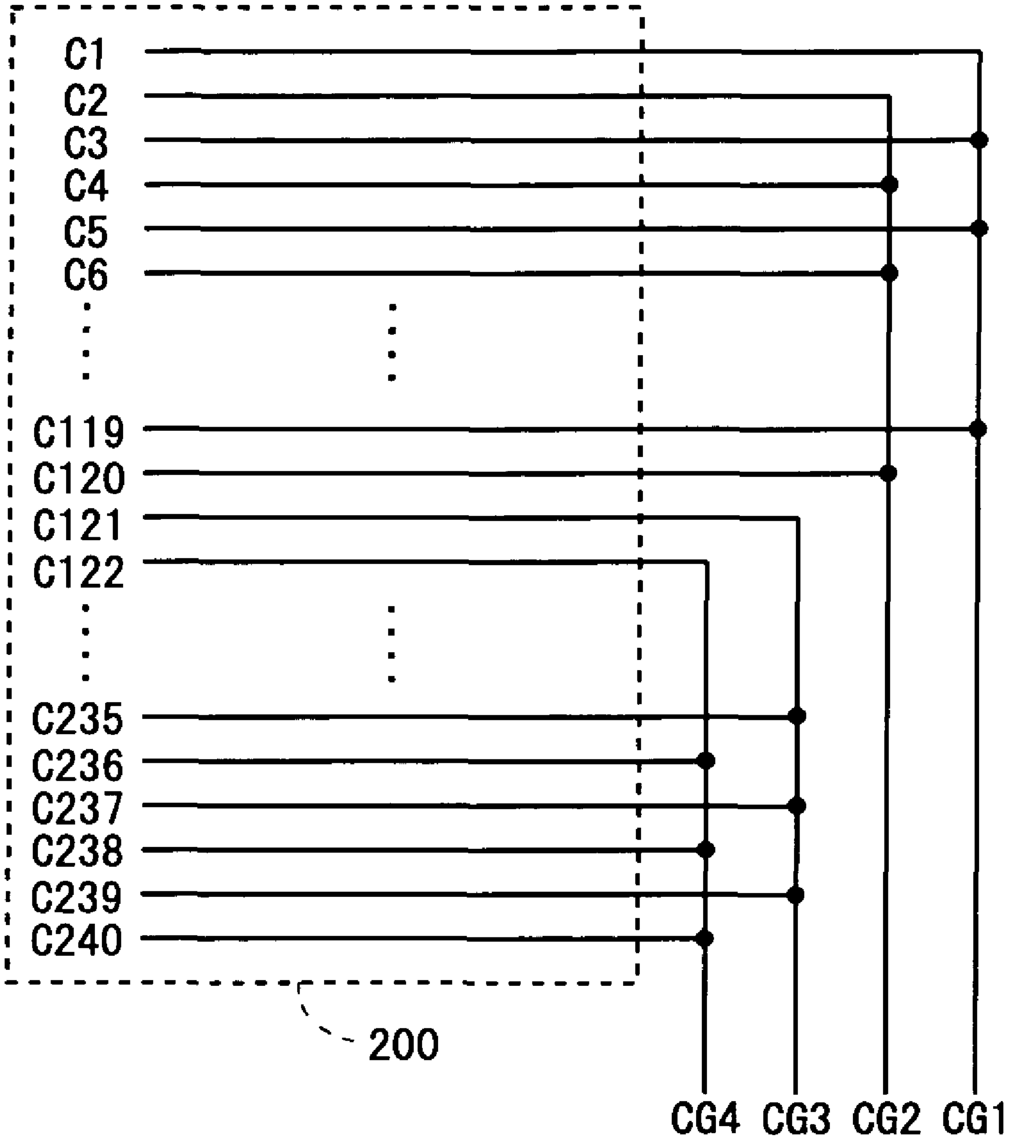
FIG. 18 is a diagram describing grouping of auxiliary capacitance lines in the third embodiment.

FIG. 17 is a block diagram illustrating configurations of drivers and a display portion 200 in a liquid crystal display device according to a third embodiment of the present invention. In the present embodiment, the auxiliary capacitance lines are divided into four groups. Note that, in the example shown in FIG. 17, there are four auxiliary capacitance lines, and therefore each group includes only one auxiliary capacitance line, but in the case where there are, for example, 240 auxiliary capacitance lines, each group includes 60 auxiliary capacitance lines. In the present embodiment, when grouping the auxiliary capacitance lines, they are initially divided into overlying groups and underlying groups with respect to the center of the display portion 200, and further divided into groups of odd-numbered rows and even-numbered rows. For example, when there are 240 auxiliary capacitance lines, the auxiliary capacitance lines in the "first row, third row, fifth row, . . . , and 119th row" are included in a first auxiliary capacitance line group CG1, the auxiliary capacitance lines in the "second row, fourth row, sixth row, . . . , and 120th row" are included in a second auxiliary capacitance line group CG2, the auxiliary capacitance lines in the "121st row, . . . , 235th row, 237th row, and 239th row" are included in a third auxiliary capacitance line group CG3, and the auxiliary capacitance lines in the "122nd row, . . . , 236th row, 238th row, and 240th row" are included in a fourth auxiliary capacitance line group CG4, as shown in FIG. 18.

Each of the auxiliary capacitance line groups CG1 to CG4 is driven, for example, by the display control circuit 100 shown in FIG. 2 providing each of the groups CG1 to CG4 with a signal exclusive thereto.

Hereinafter, a drive method in the present embodiment will be described. FIGS. 19A to 19G respectively illustrate waveforms of a selection signal applied to the first-row gate line G1, a selection signal applied to the second-row gate line G2, a selection signal applied to the third-row gate line G3, a selection signal applied to the fourth-row gate line G4, a drive video signal applied to the source line Sj, the common electrode voltage Com, and the output voltage control signal AB. FIGS. 20A to 20E respectively illustrate waveforms of a pixel electrode voltage of the pixel formation portion A1*j*, an auxiliary capacitance line drive signal applied to the first-row auxiliary capacitance line C1, a pixel electrode voltage of the pixel formation portion A2*j*, an auxiliary capacitance line drive signal applied to the second-row auxiliary capacitance line C2, and the polarity signal PP. FIGS. 21A to 21E respectively illustrate waveforms of a pixel electrode voltage of the pixel formation portion A3*j*, an auxiliary capacitance line drive signal applied to the third-row auxiliary capacitance line C3, a pixel electrode voltage of the pixel formation portion A4*j*, an auxiliary capacitance line drive signal applied to the fourth-row auxiliary capacitance line C4, and the polarity signal PP.

Firstly, a method for driving the first row of the pixel matrix will be described.

During a period from time point t0 to time point t01, a first selection voltage VH is applied to the first-row gate line G1. As a result, the TFT 20 of the pixel formation portion A1*j* is rendered conductive. Also, during this period, the polarity signal PP is at low level, and the output voltage control signal AB is at low level. Accordingly, as shown in FIG. 5, a voltage corresponding to each tone value between the source maximum voltage maxVS and the source minimum voltage minVS is applied to the source line Sj when a tone value of the input signal Dx is from "0" to "42", and the source minimum voltage minVS is applied to the source line Sj when a tone value of the input signal Dx is from "43" to "63". Also, a predetermined voltage VCN is applied to the common electrode 24, and a predetermined voltage VCM is applied to the first-row auxiliary capacitance line C1.

During a period from time point t01 to time point t02, a deselection voltage VL is applied to the first-row gate line G1. As a result, the TFT 20 of the pixel formation portion A1*j* is rendered non-conductive. Moreover, during this period, the voltage of the first-row auxiliary capacitance line C1 rises from VCM to VCN. Note that in this case also, it is assumed that the pixel electrode Pij is capacitively coupled only to the auxiliary capacitance line Ck and the common electrode 24, and capacitance coupling of the pixel electrode Pij with the source line Sj and capacitance coupling of the pixel electrode Pij with the gate line G1 are not considered.

Since the TFT 20 of the pixel formation portion A1*j* is non-conductive, the rise of the voltage of the auxiliary capacitance line Ck from VCM to VCN causes the voltage of the pixel electrode P1*j* to rise. Here, the voltages are set such that equation (30) below is established in order for the voltage of the pixel electrode P1*j* to rise by "VSH−VSM".

$$VSH=VSM+(VCN-VCM)\times Cs/(Cs+Clc) \quad (30)$$

Accordingly, the amount of voltage change ΔVP of the pixel electrode P1*j* is such that:

$$\Delta VP=(VCN-VCM)\times Cs/(Cs+Clc) \quad (31).$$

During a period from time point t02 to time point t03, a second selection voltage VM is applied to the first-row gate line G1. Also, during this period, the polarity signal PP is at low level, and the output voltage control signal AB is at high level. Accordingly, as shown in FIG. 5, the source maximum voltage maxVS is applied to the source line Sj when a tone value of the input signal Dx is from "0" to "20", and a voltage corresponding to each tone value between the source maximum voltage maxVS and the source minimum voltage minVS is applied to the source line Sj when a tone value of the input signal Dx is from "21" to "63".

In this manner, as for any pixel formation portion A1*j* including the pixel electrode P1*j* to which any one of the voltages VSH to VSM corresponding to tone values from "0" to "20" is applied during the first selection period, the source maximum voltage VSH is applied to the source line Sj during the second selection period, thereby rendering the TFT 20 non-conductive. As a result, in the pixel formation portion A1*j*, the pixel electrode voltage is maintained at a level raised during the period from time point t01 to time point t02. Also, as for any pixel formation portion A1*j* including the pixel electrode P1*j* to which any one of the voltages VSM to VSL corresponding to tone values from "21" to "42" is applied during the first selection period, a voltage from "VSM+ΔVP" to "VSL+ΔVP", i.e., from the source maximum voltage VSH to the source intermediate voltage VSM, is applied to the source line Sj during the second selection period. As a result, in the pixel formation portion A1*j*, the pixel electrode voltage is maintained at a level raised during the period from time point t01 to time point t02, regardless of whether or not the TFT 20 of the pixel formation portion A1*j* is rendered conductive. Furthermore, as for any pixel formation portion A1*j* including the pixel electrode P1*j* to which the source minimum voltage VSL is applied as a voltage corresponding to a tone value from "43" to "63" during the first selection period, any one of the voltages VSM to VSL corresponding to tone values from "43" to "63" is applied to the source line Sj during the second selection period. As a result, the TFT 20 of the pixel formation portion A1*j* is rendered conductive, and in the pixel formation portion A1*j*, any one of the voltages VSM to VSL is applied to the pixel electrode P1*j*.

Figures 20A, 20B, 20C, 20D, 20E:
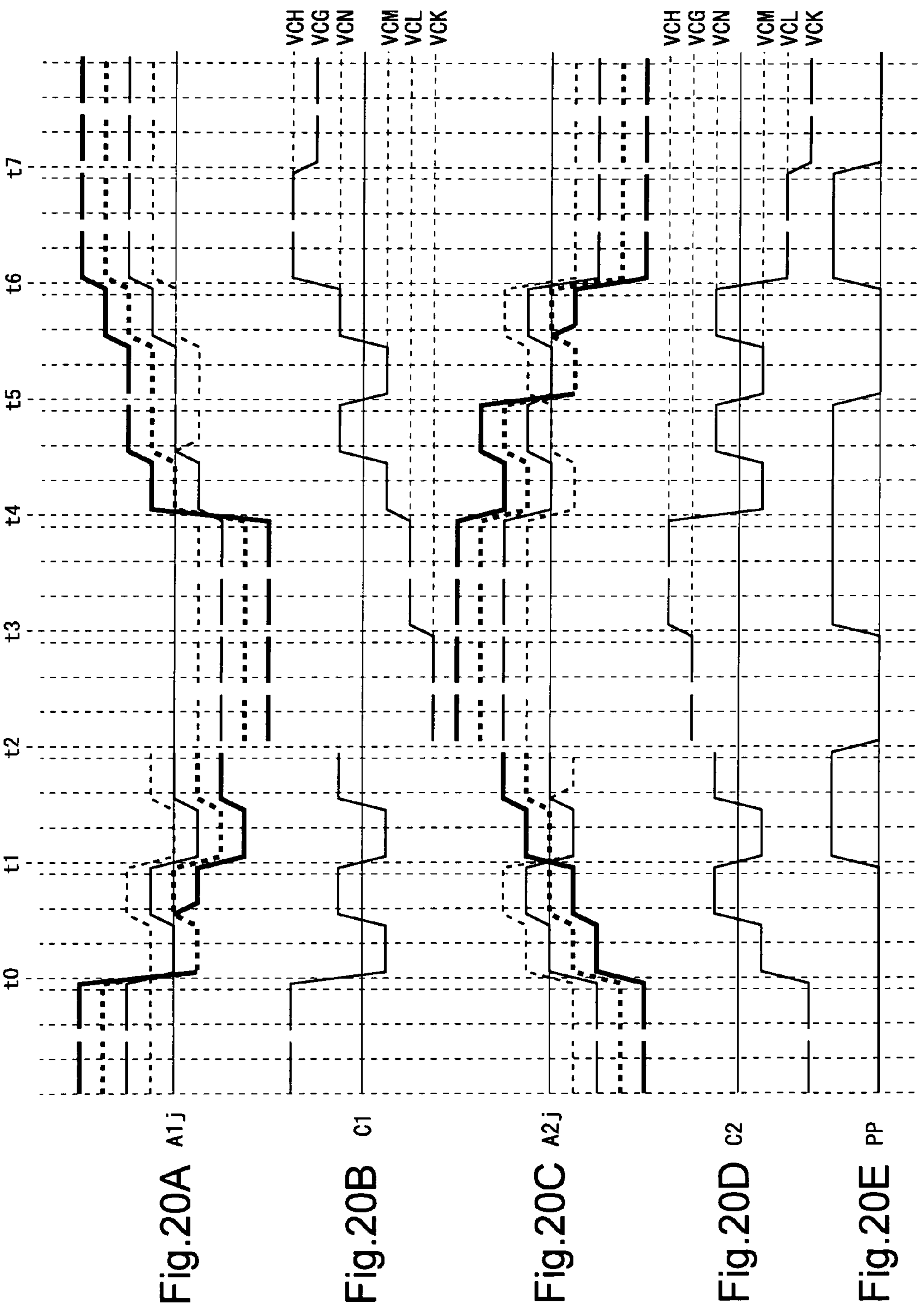
FIGS. 20A to 20E are diagrams describing a drive method in the third embodiment.
Figures 21A, 21B, 21C, 21D, 21E:
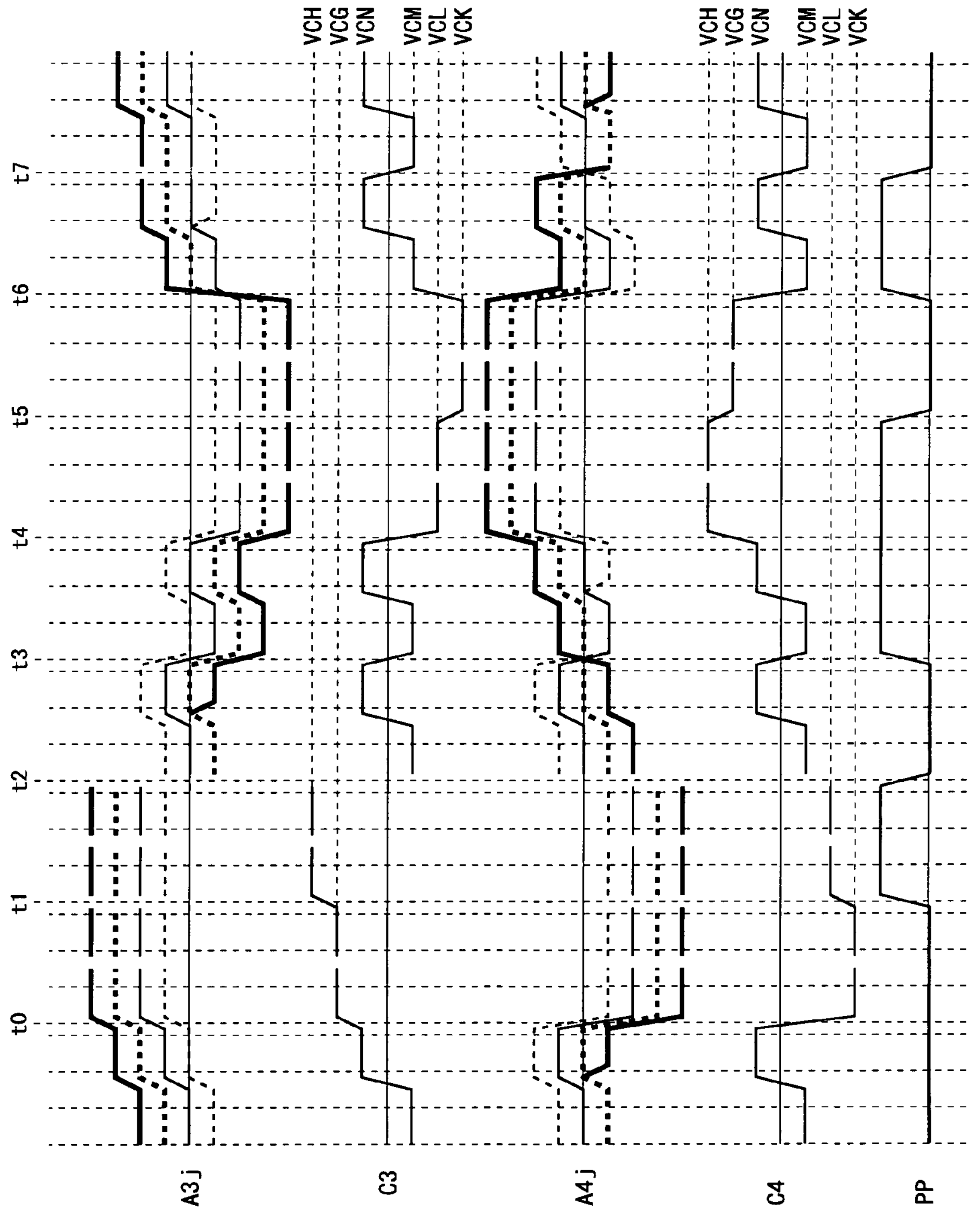
FIGS. 21A to 21E are diagrams describing a drive method in the third embodiment.

During a period from time point t1 to time point t2, the voltage of the pixel electrode P1*j* changes in accordance with a change of the voltage of the first-row auxiliary capacitance line C1. Thereafter, during a selection period (a period from time point t2 to time point t4) for the third through fourth rows, the voltage of the first-row auxiliary capacitance line C1 is set to VCK or VCL, as shown in FIG. 20B. During this period, the voltages are set as shown below, such that a voltage from VCM to "VCM−(VSH+ΔVP−VSL)" is applied to the pixel electrode P1*j*. Also, the voltages are set such that the common electrode voltage is VCN or VCM, and a voltage of a sufficiently negative value is applied to the pixel electrode P1*j*. Specifically, the following is established:

$$VCM=VSH+\Delta VP+(VCK-VCN)\times Cs/(Clc+Cs) \quad (32)\text{, by the setting:}$$

$$VCK=VCN+(VCM-(VSH+\Delta VP))\times(Clc+Cs)/Cs \quad (33).$$

Also, the following is established:

$$VCM=VSH+\Delta VP+((VCM-VCN)\times Clc+(VCL-VCN)\times Cs)/(Clc+Cs) \quad (34)\text{, by the setting:}$$

$$VCL=VCN+(VCM-(VSH+\Delta VP))\times(Clc+Cs)-(VCM-VCN)\times Clc)/Cs \quad (35).$$

Next, a method for driving the second row of the pixel matrix will be described.

During a period from time point t1 to time point t11, a first selection voltage VH is applied to the second-row gate line G2. As a result, the TFT 20 of the pixel formation portion A2*j* is rendered conductive. Also, during this period, the polarity signal PP is at high level, and the output voltage control signal AB is at low level. Therefore, as shown in FIG. 5, the source minimum voltage minVS is applied to the source line Sj when a tone value of the input signal Dx is from "0" to "20", and a voltage corresponding to each tone value between the source minimum voltage minVS and the source maximum voltage maxVS is applied to the source line Sj when a tone value of the input signal Dx is from "21" to "63". Also, a predetermined voltage VCM is applied to the common electrode 24, and a predetermined voltage VCM is applied to the first- and second-row auxiliary capacitance lines C1 and C2.

During a period from time point t11 to time point t12, a deselection voltage VL is applied to the second-row gate line G2. As a result, the TFT 20 of the pixel formation portion A2*j* is rendered non-conductive. Also, during this period, the voltage of the second-row auxiliary capacitance line C2 rises from VCM to VCN. As a result, the voltage of the pixel electrode P2*j* rises by ΔVP as shown in equation (31) above.

During a period from time point t12 to time point t13, a second selection voltage VM is applied to the second-row gate line G2. Also, during this period, the polarity signal PP is at high level, and the output voltage control signal AB is at high level. Therefore, as shown in FIG. 5, a voltage corresponding to each tone value between the source minimum voltage minVS and the source maximum voltage maxVS is applied to the source line Sj when a tone value of the input signal Dx is from "0" to "42", and the source maximum voltage maxVS is applied to the source line Sj when a tone value of the input signal Dx is from "43" to "63".

In this manner, as for any pixel formation portion A2*j* including the pixel electrode P2*j* to which any one of the voltages VSM to VSH corresponding to tone values from "43" to "63" is applied during the first selection period, the source maximum voltage VSH is applied to the source line Sj during the second selection period, thereby rendering the TFT 20 non-conductive. As a result, in the pixel formation portion A2*j*, the pixel electrode voltage is maintained at a level raised during the period from time point t11 to time point t12. Also, as for any pixel formation portion A2*j* including the pixel electrode P2*j* to which any one of the voltages VSL to VSM corresponding to tone values from "21" to "42" is applied during the first selection period, a voltage from the source intermediate voltage VSM to the source maximum voltage VSH is applied to the source line Sj during the second selection period. As a result, in the pixel formation portion A2*j*, the pixel electrode voltage is maintained at a level raised during the period from time point t11 to time point t12, regardless of whether or not the TFT 20 of the pixel formation portion A2*j* is rendered conductive. Furthermore, as for any pixel formation portion A2*j* including the pixel electrode P2*j* to which the source minimum voltage VSL is applied as a voltage corresponding to a tone value from "0" to "20" during the first selection period, any one of the voltages VSL to VSM corresponding to tone values from "0" to "20" is applied to the source line Sj during the second selection period. As a result, the TFT 20 of the pixel formation portion A2*j* is rendered conductive, and in the pixel formation portion A2*j*, any one of the voltages VSL to VSM is applied to the pixel electrode P2*j*.

The third row and the fourth row are driven in the same manner, however, in the present embodiment, during a period in which rows underlying the center of the display portion 200 are selected (a period from time point t2 to time point t4), the voltage of the auxiliary capacitance lines included in the first auxiliary capacitance line group CG1 is set to VCK or VCL, as shown in FIG. 20B, such that a voltage of a negative polarity is applied to the odd-numbered-row pixel electrodes overlying the center of the display portion 200. Also, during this period, the voltage of the auxiliary capacitance lines included in the second auxiliary capacitance line group CG2 is set to VCG or VCH, as shown in FIG. 20D. The voltages are set as shown below, such that a voltage from VCN to "VCN+(VSH+ΔVP−VSL)" is applied to the pixel electrode P2*j* during this period. Also, the voltages are set such that the common electrode voltage is VCN or VCM, and a voltage of a sufficiently positive value is applied to the pixel electrode P2*j*. Specifically, the following is established:

$$VCN=VSL+(VCH-VCN)\times Cs/(Clc+Cs) \quad (36)\text{, by the setting:}$$

$$VCH=VCN+(VCN-VSL)\times(Clc+Cs)/Cs \quad (37).$$

Also, the following is established:

$$VCN=VSL+((VCN-VCM)\times Clc+(VCG-VCN))/(Clc+Cs) \quad (38)\text{, by the setting:}$$

$$VCG=VSN+((VCN-VSL)\times(Cs+Clc)-(VCN-VCM)\times Clc)/C \quad (39).$$

As described above, in the present embodiment, the auxiliary capacitance lines Ck are divided into four groups CG1 to CG4, and the voltage of a given auxiliary capacitance line Ck is set to VCM or VCN while writing is performed on any pixel formation portion Aij in the row corresponding to that auxiliary capacitance line Ck. In addition, upon completion of the writing to the pixel formation portion Aij, if the voltage of the pixel electrode Pij of the pixel formation portion Aij has a positive polarity, a relatively high voltage of VCH or VCG is applied to its corresponding auxiliary capacitance line Ck, and if the voltage of the pixel electrode Pij of the pixel formation portion Aij has a negative polarity, a relatively low voltage of VCK or VCL is applied to the corresponding auxiliary capacitance line Ck. As a result, a sufficiently high voltage is applied to each pixel electrode Pij.

Note that, while the auxiliary capacitance lines Ck are divided into four groups CG1 to CG4 in the third embodiment, the division into four groups is not restrictive. According to the viewpoint of "extending a period in which a sufficiently high voltage is applied to the pixel electrodes Pij", the auxiliary capacitance lines Ck are preferably divided into a greater number of groups.

Figure 22:
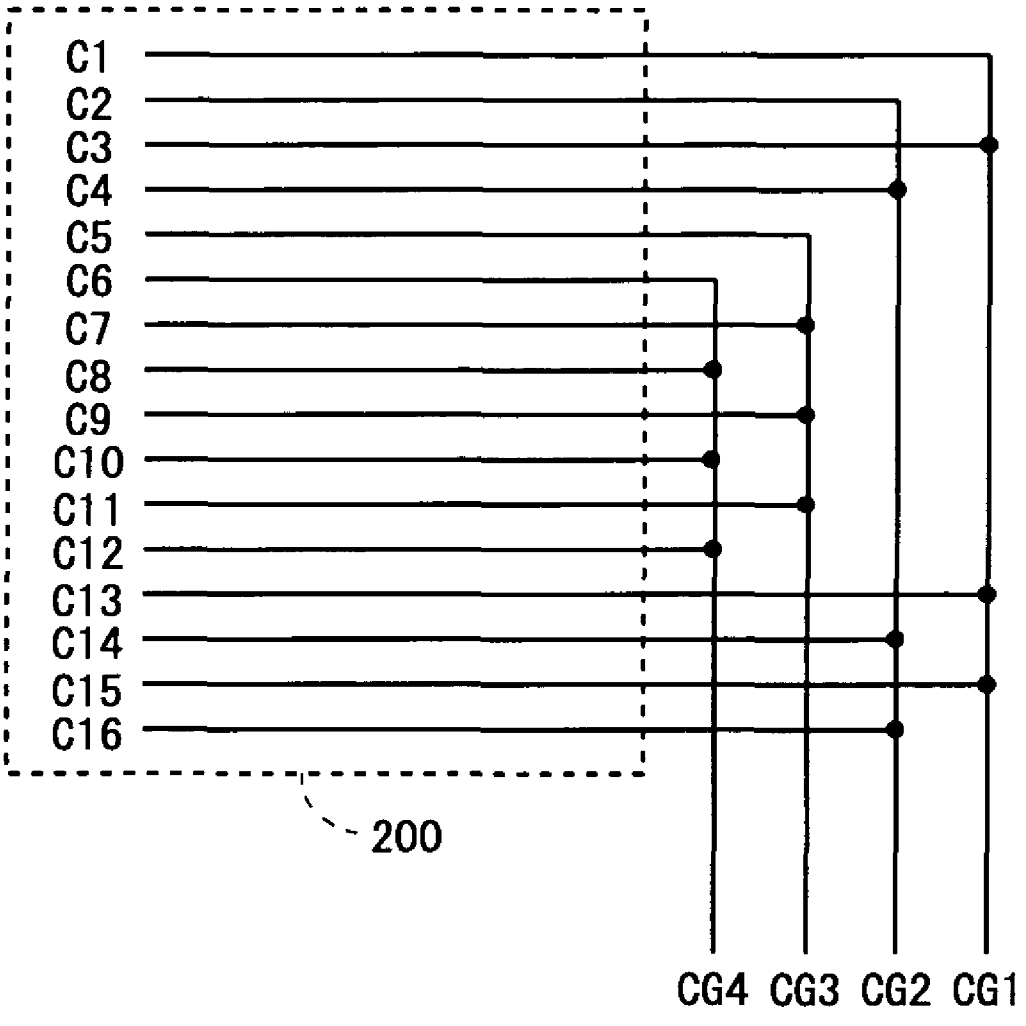
FIG. 22 is a diagram describing grouping of auxiliary capacitance lines in the third embodiment where there are provided 16 auxiliary capacitance lines.
Figure 23A:
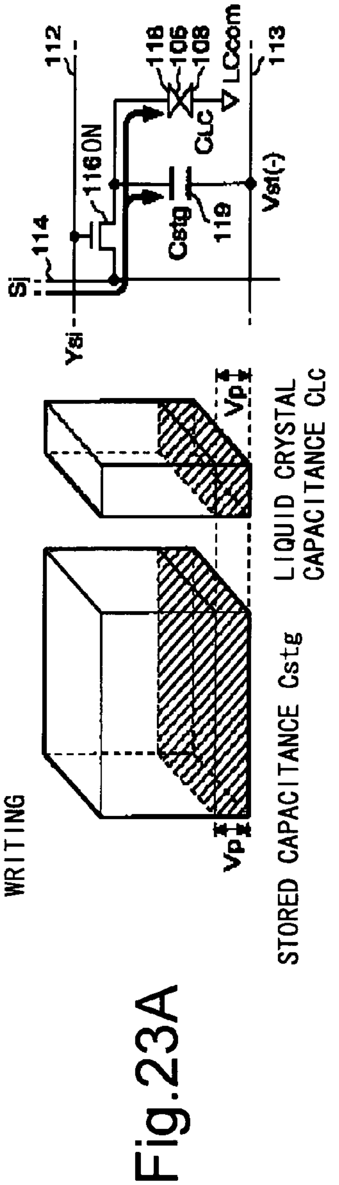
FIGS. 23A to 23C are diagrams describing operations in pixels of a liquid crystal display device in the conventional art.
Figure 23B:
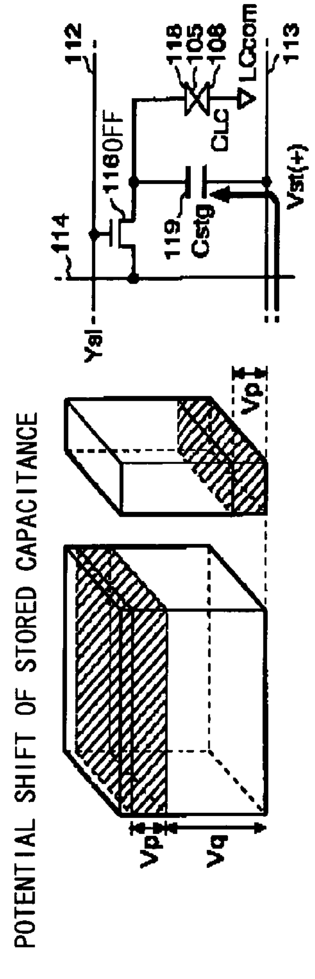
Figure 23C:
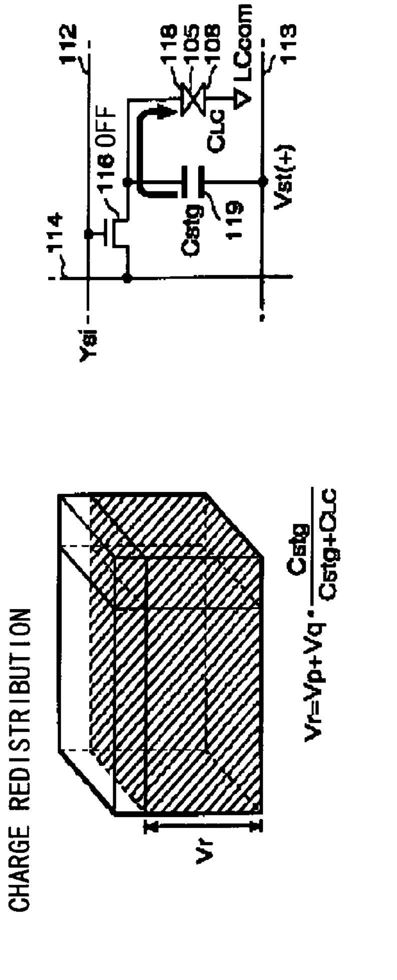
Figure 24:
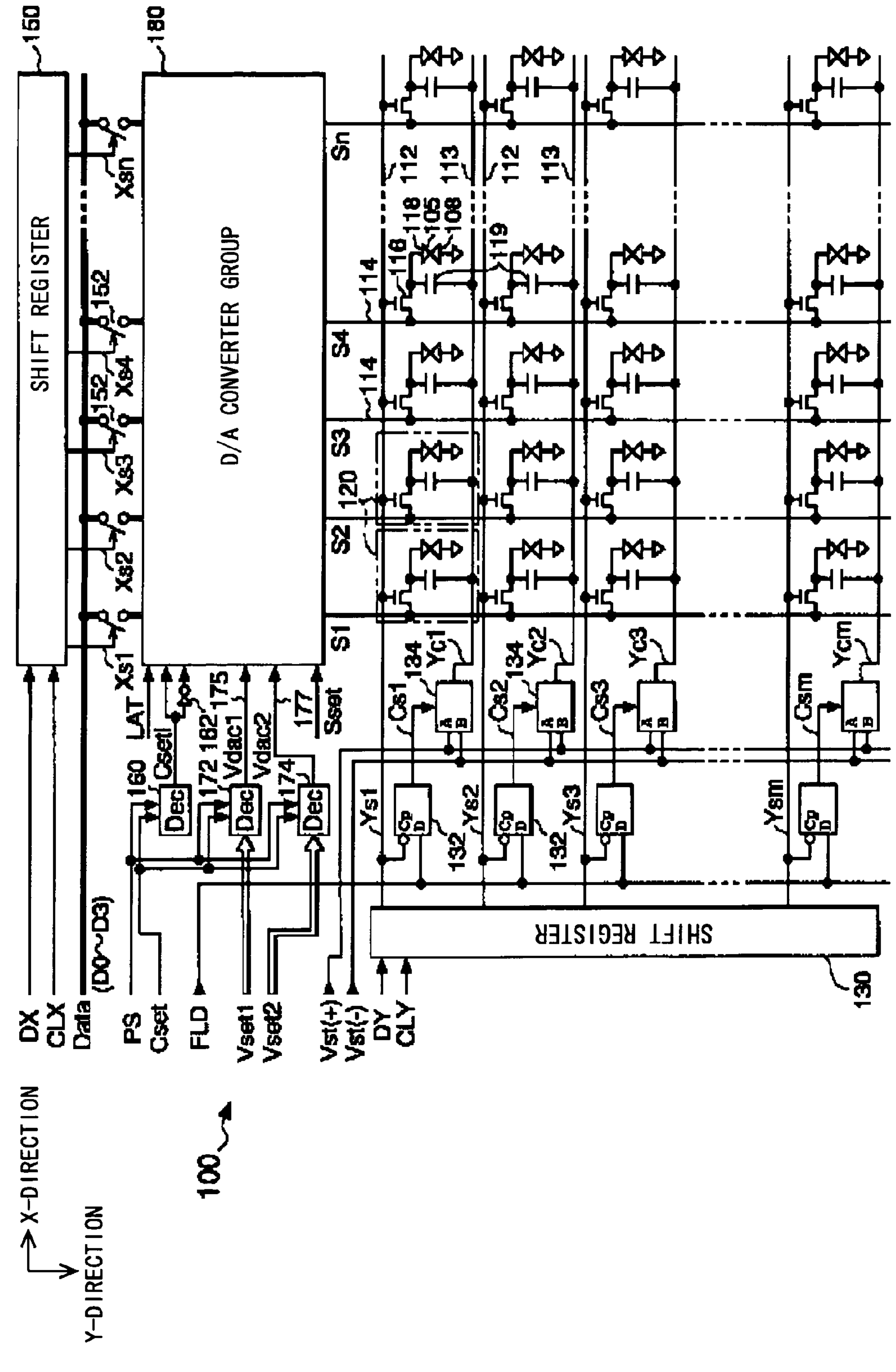
FIG. 24 is a block diagram illustrating an electrical configuration of the liquid crystal display device in the conventional art.
Figure 25:
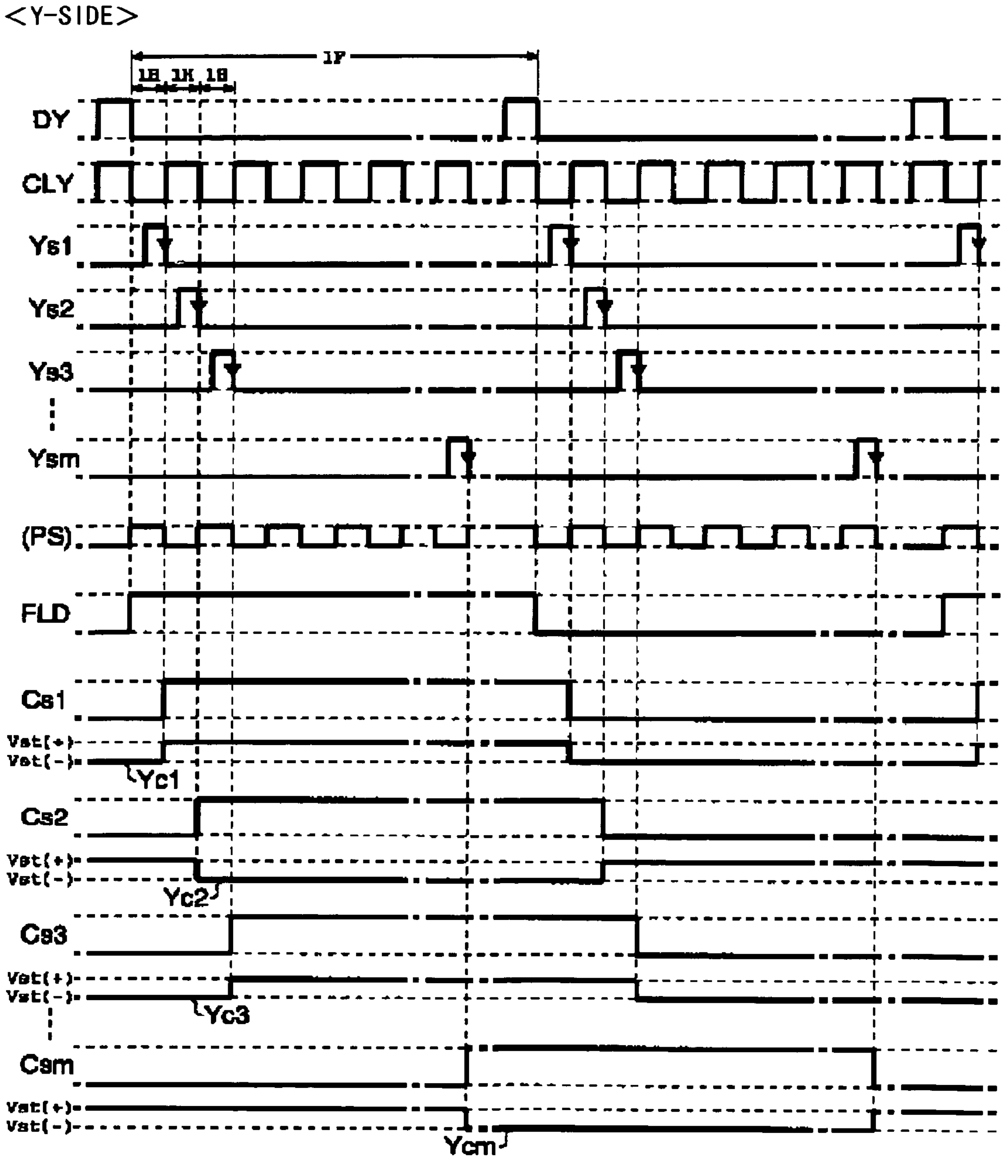
FIG. 25 provides signal waveform diagrams describing Y-side operations in the conventional art.

Also, according to the viewpoint of enhancing image quality, the auxiliary capacitance lines overlying the center of the display portion 200 are preferably assigned to the same groups as those underlying the center, as shown in FIG. 22, rather than the overlying auxiliary capacitance lines and the underlying auxiliary capacitance lines are divided into different groups. For example, in the case where there are 16 auxiliary capacitance lines C1 to C16, it is preferable that "C1, C3, C13, and C15" be assigned to the first auxiliary capacitance line group, "C2, C4, C14, and C16" be assigned to the second auxiliary capacitance line group, "C5, C7, C9, and C11" be assigned to the third auxiliary capacitance line group, and "C6, C8, C10, and C12" be assigned to the fourth auxiliary capacitance line group, as shown in FIG. 22.

5. Others

While each of the above embodiments has been described on the premise of a liquid crystal display device capable of a 64-tone gradation display, the present invention is not limited thereto. The present invention is applicable even when the number of tones is other than 64. Moreover, the present invention is also applicable to display devices other than liquid crystal display devices.

In at least one embodiment, a drive circuit for a display device is provided with a plurality of video signal lines, a plurality of scanning signal lines crossing the video signal lines, switching elements provided at their corresponding intersections between the video signal lines and the scanning signal lines and having their conduction state controlled by a scanning signal provided to their corresponding scanning signal lines, pixel electrodes electrically connected to their corresponding video signal lines via the switching elements, and a common electrode with predetermined capacitances being formed between the common electrode and the pixel electrodes. In at least one embodiment, the circuit comprises:

a scanning signal line drive circuit for selectively driving the scanning signal lines;

a video signal line drive circuit for applying a video signal to the video signal lines; and a pixel electrode potential shift portion for changing potentials of the pixel electrodes by changing potentials of predetermined electrodes capacitively coupled to the pixel electrodes, wherein, a scanning signal line selection period in which one scanning signal line is selected includes a preceding first selection period and a subsequent second selection period, the scanning signal line drive circuit applies a predetermined first selection voltage to selected scanning signal line during the first selection period, such that all switching elements for receiving a scanning signal from the selected scanning signal line are rendered conductive, and also applies a predetermined second selection voltage to the selected scanning signal line during the second selection period, such that a part of the switching elements for receiving the scanning signal from the selected scanning signal line is rendered conductive, the video signal line drive circuit applies a predetermined first voltage to the video signal lines during the second selection period, such that all switching elements corresponding to pixel electrodes that should exhibit a tone value within a predetermined first gradation range are rendered non-conductive, and the pixel electrode potential shift portion changes, during a period between the first selection period and the second selection period, the potentials of the predetermined electrodes capacitively coupled to pixel electrodes corresponding to the selected scanning signal line.

In at least one embodiment, in the drive circuit discussed above in the preceding paragraph, the pixel electrode potential shift portion changes potentials of pixel electrodes that should be subjected to writing based on a tone signal indicating a tone value within the first gradation range, the potentials being changed so as to be equivalent to or above the first voltage and to correspond to the tone value when the switching elements are of n-type, or the potentials being changed so as to be equivalent to or below the first voltage and to correspond to the tone value when the switching elements are of p-type.

In at least one embodiment, in the drive circuit discussed above, the video signal line drive circuit applies, during the first selection period, a predetermined second voltage to the video signal lines as a video signal corresponding to a tone value within a predetermined second gradation range, and a voltage corresponding to each tone value to the video signal lines as a video signal corresponding to the tone value outside the second gradation range, all switching elements corresponding to pixel electrodes that should exhibit the tone value within the second gradation range are rendered conductive during the second selection period, and the tone value within the first gradation range and the tone value within the second gradation range are exclusive to each other.

In at least one embodiment, in the drive circuit discussed above, the first voltage is a voltage within a range from a maximum value to an intermediate value of a voltage that can be applied as the video signal to the video signal lines by the video signal line drive circuit, provided that the switching elements are of n-type, or a voltage within a range from a minimum value to the intermediate value of the voltage that can be applied as the video signal to the video signal lines by the video signal line drive circuit, provided that the switching elements are of p-type, and the second voltage is a voltage within the range from the minimum value to the intermediate value of the voltage that can be applied as the video signal to the video signal lines by the video signal line drive circuit, provided that the switching elements are of n-type, or a voltage within the range from the maximum value to the intermediate value of the voltage that can be applied as the video signal to the video signal lines by the video signal line drive circuit, provided that the switching elements are of p-type.

In at least one embodiment, in the drive circuit discussed above, the scanning signal line drive circuit applies a predetermined deselection voltage to the selected scanning signal line as a scanning signal during a period between the first selection period and the second selection period, such that all switching elements for receiving the scanning signal from the selected scanning signal line are rendered non-conductive.

In at least one embodiment, in the drive circuit discussed above, the predetermined electrodes constitute the common electrode.

In at least one embodiment, in the drive circuit discussed above, the display device further includes auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, and the predetermined electrodes are the auxiliary capacitance electrodes.

In at least one embodiment, in the drive circuit discussed above, the auxiliary capacitance electrodes are provided in one-to-one correspondence with the scanning signal lines, the circuit further comprises an auxiliary capacitance electrode drive circuit for driving the auxiliary capacitance electrodes independently of one another, and the auxiliary capacitance electrode drive circuit, as the pixel electrode potential shift portion, change potentials of auxiliary capacitance electrodes corresponding to the selected scanning signal line during a period between the first selection period and the second selection period.

In at least one embodiment, in the drive circuit discussed above, the auxiliary capacitance electrodes are divided into a predetermined number of groups such that each group corresponds to a plurality of scanning signal lines, auxiliary capacitance electrodes included in each group are electrically connected to one another, and when a predetermined potential is set as a reference potential, the auxiliary capacitance electrodes included in each group have applied thereto:

- a voltage having a positive polarity and being higher than in a period in which any scanning signal line corresponding to the group is selected, during a period in which any scanning signal line corresponding to the group is not selected, provided that voltages of pixel electrodes forming the auxiliary capacitances together with the auxiliary capacitance electrodes included in the group have a positive polarity at an end point of a period in which any scanning signal line corresponding to the group is selected; or
- a voltage having a negative polarity and being higher than in the period in which any scanning signal line corresponding to the group is selected, during the period in which any scanning signal line corresponding to the group is not selected, provided that the voltages of the pixel electrodes forming the auxiliary capacitances together with the auxiliary capacitance electrodes included in the group have a negative polarity at the end point of the period in which any scanning signal line corresponding to the group is selected.

In at least one embodiment, in the drive circuit discussed above, the display device further includes auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, the auxiliary capacitance electrodes are electrically connected to the common electrode, and the predetermined electrodes constitute the common electrode or are the auxiliary capacitance electrodes.

In at least one embodiment, in the drive circuit discussed above, equation (1) below is established when the switching elements are of n-type, provided that the second selection voltage is VM, a minimum threshold voltage of the switching elements is minVth, and a maximum value of a voltage that can be applied to the video signal lines by the video signal line drive circuit as the video signal during the second selection period is maxVS2, and equation (2) below is established when the switching elements are of p-type, provided that the second selection voltage is VM, the minimum threshold voltage of the switching elements is minVth, and a minimum value of the voltage that can be applied to the video signal lines by the video signal line drive circuit as the video signal during the second selection period is minVS2:

$$VM - \min Vth < \max VS2 \quad (1),$$

$$VM + \min Vth > \min VS2 \quad (2), \text{ where } \min Vth > 0.$$

In at least one embodiment, a drive method is disclosed for a display device provided with a plurality of video signal lines, a plurality of scanning signal lines crossing the video signal lines, switching elements provided at their corresponding intersections between the video signal lines and the scanning signal lines and having their conduction state controlled by a scanning signal provided to their corresponding scanning signal lines, pixel electrodes electrically connected to their corresponding video signal lines via the switching elements, and a common electrode with predetermined capacitances being formed between the common electrode and the pixel electrodes, the method comprising:

a scanning signal line drive step for selectively driving the scanning signal lines;

a video signal line drive step for applying a video signal to the video signal lines; and a pixel electrode potential shift step for changing potentials of the pixel electrodes by changing potentials of predetermined electrodes capacitively coupled to the pixel electrodes, wherein, a scanning signal line selection period in which one scanning signal line is selected includes a preceding first selection period and a subsequent second selection period, in the scanning signal line drive step, a predetermined first selection voltage is applied to selected scanning signal line during the first selection period, such that all switching elements for receiving a scanning signal from the selected scanning signal line are rendered conductive, and a predetermined second selection voltage is applied to the selected scanning signal line during the second selection period, such that a part of the switching elements for receiving the scanning signal from the selected scanning signal line is rendered conductive, in the video signal line drive step, a predetermined first voltage is applied to the video signal lines during the second selection period, such that all switching elements corresponding to pixel electrodes that should exhibit a tone value within a predetermined first gradation range are rendered non-conductive, and in the pixel electrode potential shift step, during a period between the first selection period and the second selection period, the potentials of the predetermined electrodes capacitively coupled to pixel electrodes corresponding to the selected scanning signal line are changed.

In at least one embodiment, in the method discussed above, in the pixel electrode potential shift step, potentials of pixel electrodes that should be subjected to writing based on a tone signal indicating a tone value within the first gradation range are changed so as to be equivalent to or above the first voltage and to correspond to the tone value when the switching elements are of n-type, or the potentials are changed so as to be equivalent to or below the first voltage and to correspond to the tone value when the switching elements are of p-type.

In at least one embodiment, in the method discussed above, in the video signal line drive step, during the first selection period, a predetermined second voltage is applied to the video signal lines as a video signal corresponding to a tone value within a predetermined second gradation range, and a voltage corresponding to each tone value is applied to the video signal lines as a video signal corresponding to the tone value outside the second gradation range, all switching elements corresponding to pixel electrodes that should exhibit the tone value within the second gradation range are rendered conductive during the second selection period, and the tone value within the first gradation range and the tone value within the second gradation range are exclusive to each other.

In at least one embodiment, in the method discussed above, the first voltage is a voltage within a range from a maximum value to an intermediate value of a voltage that can be applied as the video signal to the video signal lines in the video signal line drive step, provided that the switching elements are of n-type, or a voltage within a range from a minimum value to the intermediate value of the voltage that can be applied as the video signal to the video signal lines in the video signal line drive step, provided that the switching elements are of p-type, and the second voltage is a voltage within the range from the minimum value to the intermediate value of the voltage that can be applied as the video signal to the video signal lines in the video signal line drive step, provided that the switching elements are of n-type, or a voltage within the range from the maximum value to the intermediate value of the voltage that can be applied as the video signal to the video signal lines in the video signal line drive step, provided that the switching elements are of p-type.

In at least one embodiment, in the method discussed above, in the scanning signal line drive step, a predetermined deselection voltage is applied to the selected scanning signal line as a scanning signal during a period between the first selection period and the second selection period, such that all switching elements for receiving the scanning signal from the selected scanning signal line are rendered non-conductive.

In at least one embodiment, in the method discussed above, the predetermined electrodes constitute the common electrode.

In at least one embodiment, in the method discussed above, the display device further includes auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, and the predetermined electrodes are the auxiliary capacitance electrodes.

In at least one embodiment, in the method discussed above, the auxiliary capacitance electrodes are provided in one-to-one correspondence with the scanning signal lines, the method further comprises an auxiliary capacitance electrode drive step for driving the auxiliary capacitance electrodes independently of one another, and in the auxiliary capacitance electrode drive step, as the pixel electrode potential shift step, potentials of auxiliary capacitance electrodes corresponding to the selected scanning signal line are changed during a period between the first selection period and the second selection period.

In at least one embodiment, in the method discussed above, the auxiliary capacitance electrodes are divided into a predetermined number of groups such that each group corresponds to a plurality of scanning signal lines, auxiliary capacitance electrodes included in each group are electrically connected to one another, and when a predetermined potential is set as a reference potential, the auxiliary capacitance electrodes included in each group have applied thereto:

a voltage having a positive polarity and being higher than in a period in which any scanning signal line corresponding to the group is selected, during a period in which any scanning signal line corresponding to the group is not selected, provided that voltages of pixel electrodes forming the auxiliary capacitances together with the auxiliary capacitance electrodes included in the group have a positive polarity at an end point of a period in which any scanning signal line corresponding to the group is selected; or a voltage having a negative polarity and being higher than in the period in which any scanning signal line corresponding to the group is selected, during the period in which any scanning signal line corresponding to the group is not selected, provided that the voltages of the pixel electrodes forming the auxiliary capacitances together with the auxiliary capacitance electrodes included in the group have a negative polarity at the end point of the period in which any scanning signal line corresponding to the group is selected.

In at least one embodiment, in the method discussed above, the display device further includes auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, the auxiliary capacitance electrodes are electrically connected to the common electrode, and the predetermined electrodes constitute the common electrode or are the auxiliary capacitance electrodes.

In at least one embodiment, in the method discussed above, equation (1) below is established when the switching elements are of n-type, provided that the second selection voltage is VM, a minimum threshold voltage of the switching elements is minVth, and a maximum value of a voltage that can be applied to the video signal lines in the video signal line drive step as the video signal during the second selection period is maxVS2, and equation (2) below is established when the switching elements are of p-type, provided that the second selection voltage is VM, the minimum threshold voltage of the switching elements is minVth, and a minimum value of the voltage that can be applied to the video signal lines in the video signal line drive step as the video signal during the second selection period is minVS2:

$$VM - \min Vth < \max VS2 \quad (1),$$

$$VM + \min Vth > \min VS2 \quad (2), \text{ where } \min Vth > 0.$$

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A display device provided with a plurality of video signal lines, a plurality of scanning signal lines crossing the video signal lines, switching elements provided at their corresponding intersections between the video signal lines and the scanning signal lines and having their conduction state controlled by a scanning signal provided to their corresponding scanning signal lines, pixel electrodes electrically connected to their corresponding video signal lines via the switching elements, a common electrode with predetermined capacitances being formed between the common electrode and the pixel electrodes, a scanning signal line drive circuit for selectively driving the scanning signal lines, and a video signal line drive circuit for applying a video signal to the video signal lines, the device comprising:

a pixel electrode potential shift portion for changing potentials of the pixel electrodes by changing potentials of predetermined electrodes capacitively coupled to the pixel electrodes, wherein, a scanning signal line selection period in which one scanning signal line is selected includes a preceding first selection period and a subsequent second selection period, the scanning signal line drive circuit applies a predetermined first selection voltage to selected scanning signal line during the first selection period, such that all switching elements for receiving a scanning signal from the selected scanning signal line are rendered conductive, and also applies a predetermined second selection voltage to the selected scanning signal line during the second selection period, such that a part of the switching elements for receiving the scanning signal from the selected scanning signal line is rendered conductive, the video signal line drive circuit applies a predetermined first voltage to the video signal lines during the second selection period, such that all switching elements corresponding to pixel electrodes that should exhibit a tone value within a predetermined first gradation range are rendered non-conductive, and the pixel electrode potential shift portion changes, during a period between the first selection period and the second selection period, the potentials of the predetermined electrodes capacitively coupled to pixel electrodes corresponding to the selected scanning signal line.

2. The display device according to claim 1, wherein the pixel electrode potential shift portion changes potentials of pixel electrodes that should be subjected to writing based on a tone signal indicating a tone value within the first gradation range, the potentials being changed so as to be equivalent to or above the first voltage and to correspond to the tone value when the switching elements are of n-type, or the potentials being changed so as to be equivalent to or below the first voltage and to correspond to the tone value when the switching elements are of p-type.

3. The display device according to claim 1, wherein, the video signal line drive circuit applies, during the first selection period, a predetermined second voltage to the video signal lines as a video signal corresponding to a tone value within a predetermined second gradation range, and a voltage corresponding to each tone value to the video signal lines as a video signal corresponding to the tone value outside the second gradation range, all switching elements corresponding to pixel electrodes that should exhibit the tone value within the second gradation range are rendered conductive during the second selection period, and the tone value within the first gradation range and the tone value within the second gradation range are exclusive to each other.

4. The display device according to claim 3, wherein, the first voltage is a voltage within a range from a maximum value to an intermediate value of a voltage that can be applied as the video signal to the video signal lines by the video signal line drive circuit, provided that the switching elements are of n-type, or a voltage within a range from a minimum value to the intermediate value of the voltage that can be applied as the video signal to the video signal lines by the video signal line drive circuit, provided that the switching elements are of p-type, and the second voltage is a voltage within the range from the minimum value to the intermediate value of the voltage that can be applied as the video signal to the video signal lines by the video signal line drive circuit, provided that the switching elements are of n-type, or a voltage within the range from the maximum value to the intermediate value of the voltage that can be applied as the video signal to the video signal lines by the video signal line drive circuit, provided that the switching elements are of p-type.

5. The display device according to claim 1, wherein the scanning signal line drive circuit applies a predetermined deselection voltage to the selected scanning signal line as a scanning signal during a period between the first selection period and the second selection period, such that all switching elements for receiving the scanning signal from the selected scanning signal line are rendered non-conductive.

6. The display device according to claim 1, wherein the predetermined electrodes constitute the common electrode.

7. The display device according to claim 1, further comprising auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, wherein, the predetermined electrodes are the auxiliary capacitance electrodes.

8. The display device according to claim 7, wherein, the auxiliary capacitance electrodes are provided in one-to-one correspondence with the scanning signal lines, the device further comprises an auxiliary capacitance electrode drive circuit for driving the auxiliary capacitance electrodes independently of one another, and the auxiliary capacitance electrode drive circuit, as the pixel electrode potential shift portion, change potentials of auxiliary capacitance electrodes corresponding to the selected scanning signal line during a period between the first selection period and the second selection period.

9. The display device according to claim 7, wherein, the auxiliary capacitance electrodes are divided into a predetermined number of groups such that each group corresponds to a plurality of scanning signal lines, auxiliary capacitance electrodes included in each group are electrically connected to one another, and when a predetermined potential is set as a reference potential, the auxiliary capacitance electrodes included in each group have applied thereto:

a voltage having a positive polarity and being higher than in a period in which any scanning signal line corresponding to the group is selected, during a period in which any scanning signal line corresponding to the group is not selected, provided that voltages of pixel electrodes forming the auxiliary capacitances together with the auxiliary capacitance electrodes included in the group have a positive polarity at an end point of a period in which any scanning signal line corresponding to the group is selected; or a voltage having a negative polarity and being higher than in the period in which any scanning signal line corresponding to the group is selected, during the period in which any scanning signal line corresponding to the group is not selected, provided that the voltages of the pixel electrodes forming the auxiliary capacitances together with the auxiliary capacitance electrodes included in the group have a negative polarity at the end point of the period in which any scanning signal line corresponding to the group is selected.

10. The display device according to claim 1, further comprising auxiliary capacitance electrodes for forming auxiliary capacitances to support the predetermined capacitances formed between the pixel electrodes and the common electrode, the auxiliary capacitances being formed between the pixel electrodes and the auxiliary capacitance electrodes, wherein, the auxiliary capacitance electrodes are electrically connected to the common electrode, and the predetermined electrodes constitute the common electrode or are the auxiliary capacitance electrodes.

11. The display device according to claim 1, wherein equation (1) below is established when the switching elements are of n-type, provided that the second selection voltage is VM, a minimum threshold voltage of the switching elements is minVth, and a maximum value of a voltage that can be applied to the video signal lines by the video signal line drive circuit as the video signal during the second selection period is maxVS2, and equation (2) below is established when the switching elements are of p-type, provided that the second selection voltage is VM, the minimum threshold voltage of the switching elements is minVth, and a minimum value of the voltage that can be applied to the video signal lines by the video signal line drive circuit as the video signal during the second selection period is minVS2:

$$VM - \min Vth < \max VS2 \quad (1),$$

$$VM + \min Vth > \min VS2 \quad (2), \text{ where } \min Vth > 0.$$

* * * * *